US012786039B2

(12) United States Patent
Vineetha Harish et al.

(10) Patent No.: US 12,786,039 B2
(45) Date of Patent: Nov. 3, 2026

(54) BRIDGE NETWORK DEVICE MANAGER

(71) Applicant: University of Plymouth, Plymouth (GB)

(72) Inventors: Avanthika Vineetha Harish, Plymouth (GB); Kevin David Jones, Ivybridge (GB); Kimberly Kim-chi Tam, Ivybridge (GB)

(73) Assignee: University of Plymouth, Plymouth (GB)

( * ) Notice: Subject to any disclaimer, the term of this patent is extended or adjusted under 35 U.S.C. 154(b) by 184 days.

(21) Appl. No.: 18/817,350

(22) Filed: Aug. 28, 2024

(65) Prior Publication Data

US 2025/0080392 A1 Mar. 6, 2025

Related U.S. Application Data

(60) Provisional application No. 63/535,066, filed on Aug. 28, 2023.

(51) Int. Cl.
*G06F 15/173* (2006.01)
*G06F 16/23* (2019.01)
*G06F 16/245* (2019.01)
*H04L 41/042* (2022.01)

(52) U.S. Cl.
CPC ........ *H04L 41/042* (2013.01); *G06F 16/2379* (2019.01); *G06F 16/245* (2019.01)

(58) Field of Classification Search
CPC ...... H04L 41/0853; H04L 41/16; H04L 41/12
See application file for complete search history.

(56) References Cited

U.S. PATENT DOCUMENTS

2020/0210871 A1* 7/2020 Alperovich ............ G06N 20/00

FOREIGN PATENT DOCUMENTS

EP 3459840 A1 3/2019

OTHER PUBLICATIONS

International Seraching Authority, "Written Opinion" in International Application No. PCT /US2024/044102, filed Aug. 28, 2024, 6 pages.
Censys, "Exposure management and threat hunting solutions: Censys", 2023, Retrieved from https://censys.io.
(Continued)

*Primary Examiner* — Padma Mundur
(74) *Attorney, Agent, or Firm* — Hickman Becker Bingham Ledesma LLP

(57) ABSTRACT

A method of a bridge network device manager can include performing a first query on a device of a network of operational technology devices; gathering first feature information of the device based on the first query; generating a first instance of a device record that includes the first feature information; selecting a second query based on the first instance of the device record, the second query selected from a query set for features of operational technology devices operating in a particular physical domain; performing the second query on the device; gathering second feature information of the device based on the second query; updating the device record based on the second feature information to generate an updated device record; and predicting a type of the device based on the updated device record. Additional queries can be performed to predict the device record.

20 Claims, 10 Drawing Sheets

(56) References Cited

OTHER PUBLICATIONS

IASME, "IASME launches cyber security scheme for the maritime industry", 2021, Retrieved from https://iasme.co.uk/cyber-blog/iasme-launches-cyber-security-scheme-for-the-maritime-industry.
IACS, "Unified Requirements", 2022, Retrieved from https://iacs.org.uk/publications/unified-requirements.
IACS, "E27—Cyber Resilience of On-board Systems and Equipment. London: International Association of Classification Societies", 2022, Retrieved from https://iacs.org.uk/download/14105.
IACS, "E26—Cyber Resilience of Ships. London: International Association of Classification Societies.", 2022, Retrieved from https://iacs.org.uk/download/14104.
Hamad et al., "IoT device identification via network-flow based fingerprinting and learning" 2019, pp. 103-111, 18th IEEE International Conference on Trust, Security and Privacy in Computing, Rotorua, New Zealand.
Gehlenborg et al., "Heatmaps", 2012, Nat Methods, 9, 213. Retreived from: https://doi.org/10.1038/nmeth.1902.
FutureIoT, "Surge in obsolete network devices pose cybersecurity risk: FutureIoT", 2020, Retrieved from https://futureiot.tech/surge-in-obsolete-network-devices-pose-cybersecurity-risk.
Acord, "Situational awareness and ICS Using GRASS MARLIN: Infosec", 2017, Retrieved from https://resources.infosecinstitute.com/topics/scada-ics-security/situational-awareness-ics-using-grass-marlin.
Chauhan, "Decision Tree Algorithm, Explained: Kdnuggets", 2020, Retrieved from https://www.kdnuggets.com/2020/01/decision-tree-algorithm-explained.html.
Keary, "PCAP: Packet Capture, what it is what you need to know", 2022, Retrieved from https://www.comparitech.com/net-admin/pcap-guide.
Bolbot et al., "Developments and research directions in maritime cybersecurity: A systematic literature review and bibliometric analysis", International Journal of Critical Infrastructure Protection, 39, 100571. https://doi.org/10.1016/j.ijcip.2022.100571.
Bagur, "GPS NMEA 0183 Messaging Protocol 101: Arduino Documentation", 2023, Retrieved from https://docs.arduino.cc/learn/communication/gps-nmea-data-101.
Auvik, "What is an ARP Ttable? Address Resolution Protocol 101-Auvik", 2022, Retrieved from https://www.auvik.com/franklyit/blog/what-is-an-arp-table.
Auvik, "Network mapping software: Auvik Networks", 2023, Retrieved from https://www.auvik.com/features/network-navigation.
Amro, "Cyber-physical tracking of IoT devices: A maritime use case. Norwegian ICT conference for research and education", 2021, Retrieved from https://ojs.bibsys.no/index.php/NIK/article/view/961.
Ammar et al., "Network-protocol-based IoT device identification", 2019, (pp. 204-209). In Proceedings of the 4th International Conference on Fog and Mobile Edge Computing, Rome, Italy. Https://doi.org/10.1109/FMEC.2019.8795318.
Altexsoft, "Preparing Your Dataset for Machine Learning: 10 Steps—AltexSoft.", 2021, Retrieved from: https://www.altexsoft.com/blog/preparing-your-dataset-for-machine-learning-8-basic-techniques-that-make-your-data-better/.
Alharbi, "Writing a Penetration Testing Report", 2010, Retrieved from: https://sansorg.egnyte.com/dl/yNfjHOQix8.
CVE Mitre, "CVE-2020-12117" 2020, Retrieved from https://cve.mitre.org/cgi-bin/cvename.cgi?name=CVE-2020-12117.
Nmap, "Nmap: The Network Mapper—Free Security Scanner", 2023, Retrieved from https://nmap.org.
US Coast Guard, "Cyber Strategic Outlook Aug. 2021", 2021, Retrieved from https://www.uscg.mil/Portals/0/Images/cyber/2021-Cyber-Strategic-Outlook.pdf.
Tam et al., "MaCRA: A model-based framework for maritime cyber-risk assessment.", 2019, WMU Journal of Maritime Affairs, 18(1), 129-163, http://dx.doi.org/10.1007/s13437-019-00162-2.
Tam et al., "Cyber-SHIP: Developing next generation maritime cyber research capabilities", 2019, In Proceedings of the International Conference on Marine Engineering and Technology Oman 2019. Muscat, Oman, https://doi.org/10.24868/icmet.oman.2019.005.
Solarwinds, "Network Topology Mapper—Network Mapping Software", 2023, Retrieved from https://www.solarwinds.com/network-topology-mapper.
Sivanathan et al., "Characterizing and classifying IoT traffic in smart cities and campuses" 2017, pp. 559-564. In Proceedings of the 2017 IEEE Conference on Computer Communications Workshops. Atlanta, USA. Https://doi.org/10.1109/INFCOMW.2017.8116438.
Sivanathan et al., "Can we classify an IoT device using TCP port scan?", 2018, In Proceedings of the IEEE 9th International Conference on Information and Automation for Sustainability. Colombo, Sri Lanka. Https://doi.org/10.1109/ICIAFS.2018.8913346.
Shodan, "Shodan Search Engine", 2023, Retrieved from https://www.shodan.io.
Rapid7, "Metasploit Framework: Metasploit Documentation", 2023, Retrieved from https://docs.rapid7.com/metasploit/msf-overview.
IASME, "Maritime Cyber Baseline Self-Assessment Questions", 2021, Retrieved from https://iasme.co.uk/wp-content/uploads/2022/11/Maritime-Question-Booklet_V1.1.pdf.
NSA, "GRASSMARLIN user guide", 2017, Retrieved from https://github.com/iadgov/GRASSMARLIN/blob/master/GRASSMARLINUserGuide.pdf.
Jeon et al., "A ship area network with WiMedia wireless gateway applying a cooperative transmission", 2014, Contemporary Engineering Sciences, 7(23), 1235-1243. http://dx.doi.org/10.12988/ces.2014.49153.
Nmap, "Chapter 4. Port Scanning Overview: Nmap Network Scanning", 2023, Retrieved from https://nmap.org/book/port-scanning.html#most-popular-ports.
NIST, "National Vulnerability Database (NVD)", 2022, Retrieved from https://www.nist.gov/programs-projects/national-vulnerability-database-nvd.
Networkx, "NetworkX documentation", 2023, Retrieved from https://networkx.org.
Moxa, "Which are the most common TCP and UDP ports used by serial-to-Ethernet device servers?", 2023, Retrieved from https://www.moxa.com/en/support/product-support/product-faq/most-common-tcp-udp-ports-used-by-serial-to-ethernet-device-servers.
Loomis et al., "Raising the colors: Signaling for cooperation on maritime cybersecurity", 2021, Retrieved from https://www.atlanticcouncil.org/wp-content/uploads/2021/10/Raising-the-colors-Signaling-for-cooperation-on-maritime- cybersecurity.pdf.
Liu et al., "Machine learning for the detection and identification of internet of things devices: A survey", 2022, IEEE Internet of Things Journal, 9(1), 298-320. https://doi.org/10.1109/JIOT.2021.3099028.
Kretschmann et al., "Machine Learning in Maritime Logistics", 2022, Retrieved from https://shipzero.com/wp-content/uploads/2022/12/10015_compressed.pdf.
Vineetha et al., "Investigating the security and accessibility of voyage data recorder data using a USB attack" 2022, pp. 74-80, In Proceedings of the 7th International Conference on Cyber-Technologies and Cyber-Systems. Valencia, Spain.
Pedregosa et al., "Scikit-learn: Machine Learning in Python", 2011, Journal of Machine Learning Research, 12, 2825-2830, Available from: https://www.jmlr.org/papers/volume12/pedregosa11a/pedregosa11a.pdf.

* cited by examiner

BRIDGE NETWORK DEVICE MANAGER

BENEFIT CLAIM

This application claims the benefit of provisional application 63/535,066, filed Aug. 28, 2023, the entire contents of which is hereby incorporated by reference.

FIELD

The present disclosure relates to networked operational technology devices and, more specifically, to a bridge network device manager for networked operational technology devices.

BACKGROUND

Cybersecurity is a global problem. People are aware of vulnerabilities within connected computer systems and desire to increase the security of the computer systems. Attempts have been made to address the security of Information Technology (IT)-based systems that communicate within networks. Tools for testing IT systems identify computers and other devices based on detecting the operating system and other known network information. Unfortunately, these attempts have not addressed bridge networks that use specialized equipment that operate in the physical world.

A bridge can be a bridge of a ship, an aircraft, an operation facility, or can be any other bridge for monitoring and commanding operation of physical devices. For example, a bridge can be a command deck of a ship, a cockpit or flight deck of a plane or space shuttle, an operations control center for a factory, a control room for a water treatment plant, or any other location that includes equipment for commanding operation of physical devices.

In such domains, there are many different devices that communicate with each other. These devices include IT devices that interact with other IT devices over a network. These devices also include operational technology devices that both interact with devices over the network and interact with the physical world. Existing IT-based systems may be able to identify the existence of IT devices, but cannot identify domain-specific operational technology devices, and thus produce inaccurate outputs for domain-specific networks that include such devices. For example, an IT-based system may indicate that there are 32 devices, where four are personal computers and 28 are unknown. Not only does it not identify the majority of the devices, but those four personal computers may not even be personal computers and may instead be operational technology devices that happen to respond to particular aspects of the personal computer identification process.

An example domain is the maritime domain with ships and ports. The maritime domain differs from systems of computers connected together over a network because it uses specialized equipment sitting on bridges and in similar control rooms of ships. This equipment includes operational technology devices, which are quite different from IT devices because they interact with the physical world. For example, maritime operational technology devices include charting systems, radar systems, rudder control systems, satellite positioning system sensors, navigation systems, and other ship and port operational equipment. These devices are difficult to identify on a network because they use different protocols than traditional network devices. These devices are even difficult to physically identify because they are often hidden from sight, such as in closed cabinets.

As mentioned above, cybersecurity systems are directed to solving problems with known IT devices, such as personal computers and routers, but not specialized operational technology devices. An IT system may identify the existence of multiple nodes but cannot identify nodes beyond IT devices like computers and routers. Thus, cybersecurity systems cannot provide adequate security for specialized operational technology devices.

Mariners need to comply with evolving regulations that require an on-board asset inventory. However, there are a variety of devices in maritime systems like radar and charting systems that use different protocols, which makes it difficult to identify those devices. Also, it is easy to attach a malicious device, such as a thumb drive, in a hidden spot of a ship to infect the system. This creates a significant challenge for pen testers, ethical hackers, and mariners to properly secure a ship and comply with regulations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 1:
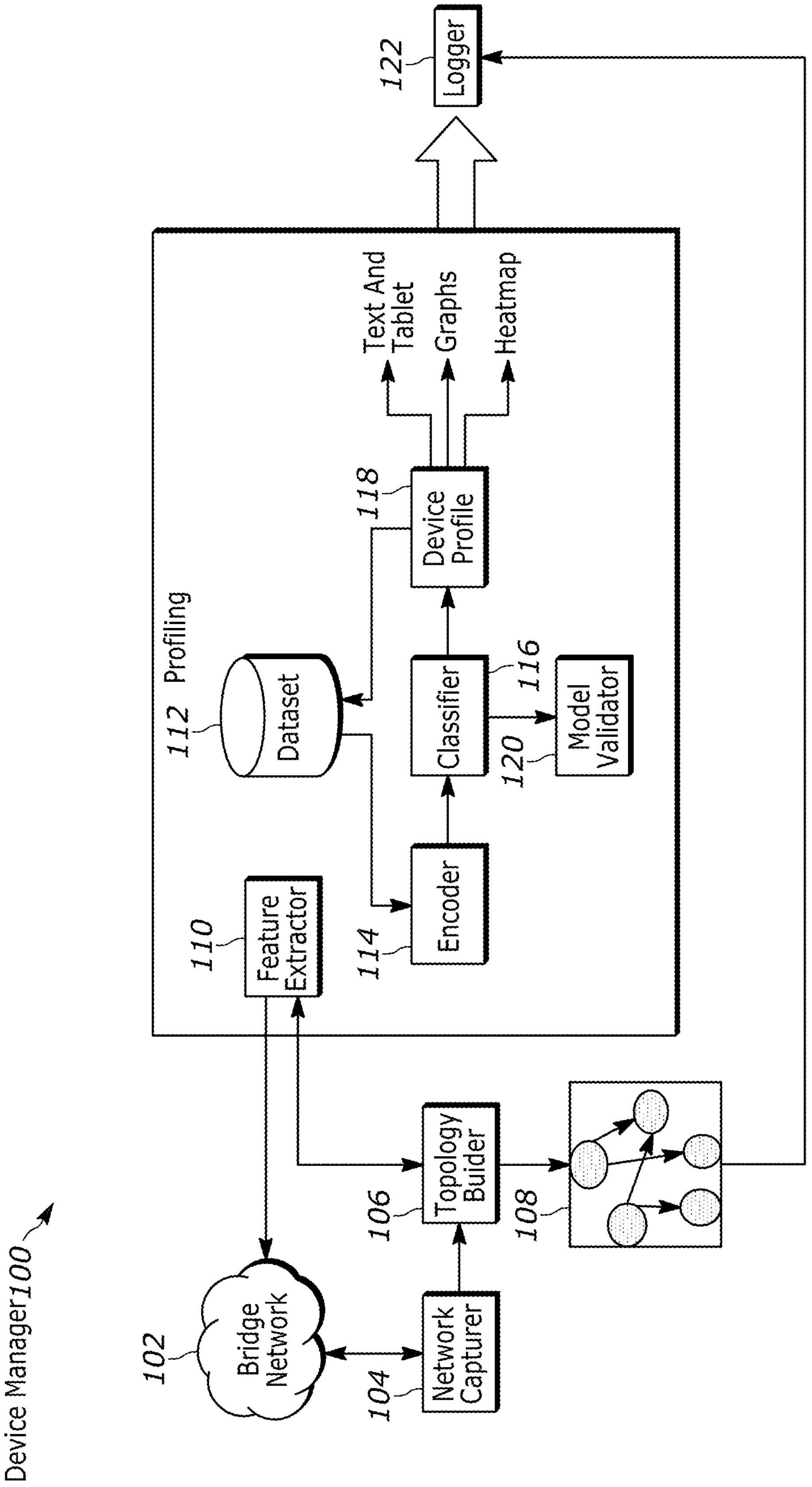
FIG. 1 is an example illustration of a device manager of a bridge network according to a possible embodiment.

FIG. 1 is an example illustration of a device manager 100 of a bridge network 102 according to a possible embodiment. In a possible implementation, the device manager 100 can be considered a profiler that scans the bridge network 102 and identifies devices on the network based 102 on a first inquiry. The device manager 100 then looks for an extra layer of information based on physical domain-specific knowledge, such as the use of specific protocols, the use of particular ports, particular communication protocols, and other physical domain-specific knowledge. The device manager 100 builds a second order inquiry from that extra layer of information. The second order inquiry pulls out information based on expected behavior of specific devices. The device manager 100 uses that expected behavior to classify devices based on knowledge of the way particular categories of devices will work. The device manager 100 can then look for another extra layer of information to identify as many specific features of the actual device as possible. That information is then part of the knowledge set that increases information in, and improves, a recognition database. Thus, the process can go from a general to a specific identification. For example, over time the process can go from knowing a device is some kind of maritime device to identifying the device as a particular radar, at model 35, at firmware level six.

For example, the device manager 100 performs a query to extract a feature of a device. It can send domain-specific inquiries to ports that have been identified as open to build feature sets that are mapped against a database to identify devices. After receiving a response to a query of a particular device, the device manager 100 can create an instantiation of a device record, such as a feature identifier of the device. The device record indicates which features of a feature set are present in the device. Information of the features is input to a classifier, which produces a prediction. For example, the classifier makes a prediction of a type of device based on the extracted features in the device record.

The device prediction provides information on how good the queries were. The device manager 100 uses this information to improve the queries and iterate until a desired level of identification is obtained. For example, subsequent queries can be selected based on the device prediction to refine subsequent predictions. Each subsequent query is picked based on the increased information obtained from previous queries and predictions, and the subsequent queries further narrow the prediction. Thus, after identifying classes/types of the devices, the device manager 100 can perform additional layers of scanning to identify specifics of the devices to produce a detailed list of devices present on the network 102.

A database can include information about a collection of devices. Some devices that might look like a personal computer may be a comms aggregator, a particular control system, or other domain-specific device. A list of ports can be useful to identify a particular device. For example, to identify whether or not the device is a particular control system the device manager 100 can determine port 25 is open and can send one or more queries to that port, which allows the device manager 100 to identify, such as classify, the device as a particular domain-specific device, like a particular control system. Having performed that second level of identification, additional queries can be sent to identify the brand, model, and other information of the device.

This can be viewed as a learned branching tree which narrows which node to walk down. As the tree is further traversed, more detail is obtained. Instead of being static, the database is now a dynamic learning environment. Thus, a more specific identification, such as manufacturer, make, model, etc., is obtained by chaining identification queries. This increasing knowledge improves the database, which allows for faster and more accurate identification of devices that have been identified in other environments, which were used to update the database.

The process can loop until the classifier has a sufficiently good identification of the device. Thus, the chain of queries allows the classifier to become accurate enough to identify the device.

In a particular maritime example, the device manager 100 can be coupled to a bridge on a ship and can identify the operational technology devices communicating with the bridge. Using a query and classification process, the device manager 100 can indicate it has found two charting devices of a certain category and of a certain model. That classification detail is provided using a learned database that the device manager 100 is using. This differs from existing tools which are only able to identify the existence of nodes on a network, and cannot identify types of operational technology devices, such as a particular charting device at a node.

At least some embodiments can increase security within the sector of bridges that monitor and command operation of physical equipment. At least some embodiments can also allow for prediction of types of devices among various operational technology devices. At least some embodiments can further identify the devices on a bridge and create a topology of which devices are communicating with each other, such as an electronic chart system gathering data from a sensor. At least some embodiments can further provide a dataset of maritime system hardware to use with a classifier for predicting devices on a network.

Embodiments can provide different implementations that are each separately unique to different aspects of the present disclosure. One unique implementation can be a feature set of operational technology devices with sufficient features to classify operational technology devices operating in a particular environment. Another implementation can be a query set built to interrogate the feature set. Another implementation can be the choice of queries from the query set to extract feature information from an operational technology device. The resulting information can be extracted and encoded in a way that a classifier can properly classify, such as predict, operational technology devices. Another implementation can be the identification of intermediate devices to generate queries to identify devices connected to the intermediate devices. Additional unique aspects of implementations are described below.

Network Capturer

The device manager 100 can include a network capturer 104. The network capturer 104 is a data collection module that begins a process of growing a database by starting network reconnaissance and gathering information from the bridge network 102. It determines what devices are connected on the network 102, their Internet Protocol (IP) addresses, their Medium Access Control (MAC) address, what device ports are open, which open ports are vulnerable, and additional information. It also identifies device-specific and sector-specific information, such as specific communication protocols. For example, the network capturer 104 can determine whether a device is communicating using a National Marine Electronics Association (NMEA) protocol, an Automatic Identification System (AIS) protocol, and/or other specific protocols. Upon receiving a network configuration in the form of a network domain address from the network 102, the network capturer 104 captures information, such as network traces, as Packet Capture (PCAP) files, data packets, and/or other data formats.

Topology Builder

The device manager 100 can include a topology builder 106. The topology builder 106 creates a network communication flow graph from the information gathered by the network capturer 104. For example, PCAP files are processed by the topology builder 106, which creates directed topology graphs 108 depicting network connections and how systems communicate.

Feature Extractor

The topology builder 106 can pass the network information to a feature extractor 110, which collects feature data to construct and/or update a dataset 112. To do so, the feature extractor 110 scans the network information and/or the network 102, gathering information about open ports, manufacturers, protocols, operating systems, and extracts these features of the devices on the network 102.

The feature extractor 110 gathers feature information to produce a record of a feature set that is used to identify a device on the network 102. In particular, the feature extractor 110 selects a query and performs the query on the device to gather information of a feature of the device and generates an instantiation of a device record that includes information of that feature in a feature set of a device record. According to a possible example, each query can provide information for a particular feature in the record and the instantiation of the record can indicate the presence or absence of that particular feature in the feature set. The gathered feature information can be used to select subsequent queries to refine information in the feature set to correctly identify the device.

For example, for each feature of interest, there can be one or more queries that will produce that information under different circumstances. The feature extractor 110 identifies a desired feature for extraction and selects, from a set of queries, the query that will likely produce the desired information. Depending on the result of that query, the feature extractor 110 may then select other queries from a known list in order to extract desired information. When the information is extracted, the knowledge of which query successfully extracted it will be in and of itself encoded as information about a feature.

For example, the feature extractor 110 sends a query to extract desired information from a device, such as a node on the network 102 and/or the topology graph 108. That information may or may not be obtained. The fact of whether the information was obtained or not is an added bit of information about the characteristic of the node. The feature extractor 110 can select another query that may or may not get the desired information. The feature extractor 110 can continue selecting and sending queries until it extracts the full desired feature set that is applicable to the kind of node that has been identified. If the node turns out to be an intermediate node, then the feature extractor 110 can send queries from an additional set of queries through the intermediate node to a connected node to determine the type of device at the connected node.

Knowing which queries identified a node is in and of itself a piece of information that is added to the dataset 112 to help select queries for each node. The set of queries in a database can be selected based on current knowledge of the node that is being queried. Knowledge obtained about successful query combinations provides a finer selection of the queries that the feature extractor 110 uses to further enhance that knowledge.

As an example, a manufacturer ID can be the first digits of in MAC address. The feature extractor now knows the device is from a particular manufacturer. Certain queries in the dataset are biased towards the particular manufacturer's devices. The feature extractor 110 can select one of those queries as the next query. The feature extractor 110 can also know the device is a particular type of device, such as a radar display, of the manufacturer. The feature extractor can then select a query that is more likely to get a positive response for a radar display.

Thus, the feature extractor 110 can know that the next desired feature will likely be picked by one of certain queries based on knowing the device is from a particular manufacturer. The feature extractor 110 builds the knowledge of the query set to extract the feature set. As the query set evolves, the feature extractor 110 gets better at getting that information with less redundancy in the way it selects queries.

As a further example, the topology builder 106 may recognize there is a node on the network 102. If the topology builder 106 does not know the type of device, it can identify the node as an unknown device. A query builder in the feature extractor 110 can add queries to determine a way of identifying the device, which expands and improves the query set for identifying unknown devices.

Dataset

The features of devices gathered by the feature extractor 110 are incorporated into a dataset 112, such as device records in a database. The dataset 112 is populated with identified features in device records. Each device record can have a feature set, such as fields of certain features. As discussed above, the feature extractor 110 selects a query and performs a query on a device to gather information of a feature of the device and generates an instantiation of a device record that includes information of that feature in the feature set. Each query can provide information for a particular feature in the record in the dataset 112 and the instantiation of the record can indicate the presence or absence of that particular feature in the feature set. Thus, the dataset 112 can include a data structure that records the feature set of a particular device. The data structure can be an instance of a device record with a feature set of features that are populated from results of queries by the feature extractor 110.

For example, the device record can have a data structure that includes a certain number of features. The feature extractor 110 uses queries to produce an instantiation of the data structure. The instantiation can indicate whether each feature of the feature set is present, not present, or unknown.

Feature Set

Queries are used to produce an instantiation of the data structure. For example, the feature set is a number of features that are recorded in a record. Queries for feature extraction produce an instance of that record. Each query can give one piece of information in a particular record of a particular device. The record can indicate whether each feature is present, not present, unknown, or otherwise identify the presence and/or absence of the feature. To elaborate, an instance of the device record can be a feature record that provides values in fields of a feature set. The feature set includes a list of features that are used to identify a particular device. Each query can give one piece of information, a feature, within that record and any random query for feature extraction will produce an instance of that record.

The feature set can include a sufficient number of features to uniquely identify classes of devices, uniquely identify models of devices within classes, and perform other device identification. The number of features can depend on the particular domain in which scanned devices are operating. For example, the feature set includes a number of features that are sufficient to identify an operational technology device operating in a particular physical domain. In the maritime domain, that number can be 21 features, 26 features, or any sufficient number of features to identify maritime operational technology devices. Other numbers of features are possible for maritime operational technology devices, aviation operational technology devices, factory operational technology devices, and operational technology devices operating in other domains.

The feature set can include features like device type, manufacturer, model number, version number, operating system, communication protocols used by the device, open port numbers of the device, and other features that can identify a device. Certain features may be particularly useful to classify an operational technology device, or at least narrow a query process for classifying an operational technology device. Such certain features can include the protocol the device responds to, the ports the device has open, and other features that, alone or in combination, can classify an operational technology device as a particular type of device. Once a device type is determined, a manufacturer identifier feature can be obtained to identify a specific device of that type.

In a possible embodiment, a query set is built to identify certain features that have been identified as sufficient to classify, such as identify or predict, maritime devices. An example feature set can include port numbers, such as: 21 (File Transfer Protocol or FTP), 22 (Secure Shell or SSH), 23 (Telnet), 25 (Simple Mail Transfer Protocol or SMTP), 445 (Microsoft Server Message Block (SMB)), 53 (Domain), 80 (Hypertext Transfer Protocol or HTTP), 81 (tiny/turbo/throttling HTTP server (THTTPD)-device specific), 137 (Netbios), 443 (https), 3389 (Windows Remote Desktop Protocol (RDP)), 5800 (VNC), 5900 (VNC), 5901 (VNC), 502 (MODBUS protocol-device specific), 4000/4001 (zmtp, remoteanything-device specific), 4800 (MOXA UDP-device specific), 10010 (rxapi-device specific), 139 (Netbios-ss), 445 (Microsoft-DS), 161 (Simple Network Management Protocol or SNMP), and 123 (Network Time Protocol or NTP). Ports 139 (Netbios-ss), 445 (Microsoft-DS), 161 (Simple Network Management Protocol or SNMP), and 123 (Network Time Protocol or NTP) can be UDP ports. The example feature set can also include other device features, such as: operating system, device model/version, device manufacturer, and device protocols, such as NMEA and AIS, in addition to the above protocols mentioned in the open ports list. Other protocols can include a Supervisory Control and Data Acquisition (SCADA) protocol, which is used for controlling, monitoring, and analyzing industrial devices and processes, and the Controller Area Network (CAN) protocol that allows devices to communicate with each other without a host computer in vehicles and other control applications. Other protocols can also be used for devices operating in other physical domains.

Protocols have characteristics that allow device identification in a way that is possible because of the protocol. In an NMEA example, the device manager 100 can look for latitude and longitude fields within a packet because a standard TCP/IP packet protocol does not typically include that information, but the NMEA protocol does. For SCADA, the device manager 100 can look at the fields that indicate instructions like turn on, turn off, go left, go right, which are protocol-based information. Thus, the device manager 100 can use characteristics of the known operational technology protocol to identify features of the device. Other domains, such as aviation domains, factory domains, train domains, and other domains can use other feature sets for operational technology devices particular to those domains.

Encoder

An encoder 114 generates encoded data based on the features in an instance of a device record by converting and preparing the data in the dataset 112 to be used by the classifier 116. When a new classification test is carried out, feature information is extracted from the dataset 112, and fed into the encoder 114, which converts the information into encoded data usable by the classifier 116. For example, the encoder 114 can provide yes/no indications of different features, such as by using ones and zeros. As a more specific example, port 421 can be a feature, a value of one can indicate port 421 is open, and a value of zero can indicate port 421 is not open.

Classifier

The encoded data of the features are provided from the encoder 114 to the classifier 116. The classifier 116 can be any classifier, such as a random forest classifier, an artificial neural network classifier, a support vector machine classifier, a Bayes classifier, or any other classifier. The classifier 116 predicts a type of device based on the features that have been identified in an instance of a device record. In a general sense, the classifier 116 drops encoded data into various buckets with increasing resolution on those buckets. The classifier 116 can predict the type of device by comparing the features to stored device feature data. The classifier 116 uses bridge domain-specific knowledge, such as a device profile for maritime, aviation, or other equipment, to predict the devices.

For example, the classifier 116 can receive all the existing features of a device in an instance of the device record information, determine the features indicate that the device has a sensor and is communicating on a certain port, and predict that the device is a radar. To do so, the classifier 116 can compare the recorded features against known sets of feature combinations to identify the device. For example, the classifier 116 can map features in the instance of the device record against an existing dataset to predict the device.

Device Profile

The classifier 116 creates a profile 118 for each the device found in the network 102 and the output is fed back to the dataset 112. For example, the feature set of a particular device record in the dataset 112 is updated to include information of the predicted type of device, which can be one of the features in the feature set.

Model Validator

The model validator 120 validates the model and calculates the classification accuracy score. The accuracy score acts as an indicator of the model's performance, with higher accuracy scores indicating that the model is better able to identify devices accurately and distinguish between different devices.

Logger

The visualization and logger 122 can generate graphs, heatmaps and other images to visually depict information about the assets which will be included in a report produced after the entire testing process. For example, the logger 122 can use information from each device profile 118 and the topology graph 108 to provide visual information about the network 102 in a manner that is easy to understand for different classes of people involved with bridge operations, diagnosis, and other processes.

To elaborate, the logger 122 can output information from the device profile 118 in various formats. These formats can include files, PDF documents, hard copies, displayed information, text, tables, graphs, port heatmaps, and other formats. Charts, graphs, and heatmaps can be useful to provide information in a form meaningful for domain users who are unfamiliar with deep technical details of the different devices. For example, the domain users may be mariners who are not IT people, and the report will indicate the devices that were found on a ship network. Some may be obvious, like a radar system, and some may be less obvious, like a rudder control unit that uses a certain brand of controller. The device profile can be mapped to regulatory requirements to ensure a particular domain is satisfying the requirements.

In an example, a heat map can identify which ports are open for different devices and can also identify the frequency of use of the ports. This can also identify which devices are similar in terms of vulnerabilities. Known vulnerabilities can also be provided for particular devices. For example, a Voyage Data Recorder (VDR) is a type of black box for ships that preserves evidence and data for accident investigations. The device profile has indicated the VDR has similar vulnerabilities to Windows personal computers and security steps can be taken to account for these vulnerabilities.

Additional Queries

In one possible embodiment, the feature extractor 110 can initiate multiple queries without further refinement to obtain the set of feature data in a device record and the classifier can 116 produce a prediction based on the resulting record.

In another possible embodiment, the queries can be refined based on predictions made by the classifier 116. In this embodiment, the feature extractor 110 performs a query to extract a feature, the classifier 116 makes a prediction based on results of that query, and the feature extractor 110 selects a subsequent query based on an updated feature dataset that includes information from the prediction. The feature extractor 110 performs this subsequent query on the device to gather information about an additional feature of the device. The use of information from the previous prediction to select the subsequent query increases the accuracy of the query.

The feature extractor 110 then updates the device record to include the additional feature in the feature set and stores the record in the database. The encoder 114 generates encoded data of features in the updated record. The classifier 116 predicts an updated type of the device by comparing the updated features to stored device feature data and updates the device profile 118. Device records in the dataset 112 can then be updated based on the updated device profile 118. The feature extractor 110 can select additional queries based on each update of the device record, which improves the accuracy of the queries, accuracy of the features, accuracy of each prediction, accuracy of the device profile 118, and accuracy of the device records in the dataset 112. Thus, the classifier 116 does a better job of classifying as the record is updated with each query based on each subsequent prediction.

Initially, there may be no information of previous predictions, so a random query can be used to determine an initial device feature for the initial prediction. As the prediction is narrowed, there is less randomness in picking the query because it is based on refined features in the prediction. Better queries are selected for additional feature information as the prediction becomes more refined. Query refinement can continue, such as until there are no more queries that would add information, which results in an accurate prediction of the device.

Intermediate Devices

Many network topologies including operational technology devices operating in physical domains are unusual when compared to classic network topologies. For example, in classic networks that have topologies with IT devices operating in the network domain, everything speaks Transmission Control Protocol (TCP)/IP over Ethernet. In many topologies with operational technology devices that operate in the physical domain, some of the devices are connected by wires to intermediate converters, such as protocol converters. In particular, the intermediate converter acts as a gateway to another, often more important device connected to the converter. The device manager 100 can take advantage of information about the physical domain and treat the converter and the connected device together as a unit by identifying the converter as an intermediate node. For example, when the device manager 100 recognizes a serial to TCP/IP converter, it may not consider a converter an end node, which a classic topology scanner would. The device manager 100 then submits queries to identify what device is on the back end of that converter. The device manager 100 can submit these queries based on the protocols being used. For example, the converter can be identified as an NMEA or RS422-to-Ethernet converter that communicates with a device that uses the NMEA or RS422 protocol and the device manager 100 can submit queries based on that protocol.

Thus, in some cases the device manager 100, such as the feature extractor 110, can perform a 2-stage scan when it identifies a converter. For example, the device manager 100 can perform a first scan and identify an intermediate device, such as a converter. The device manager 100 can then perform an additional scan by submitting an additional query to identify the device connected to that intermediate device by using the information received, such as by using knowledge of protocols being used. The device manager 100 may infer the protocol from information about the context, such as from identified features. The device manager 100 can also infer the type of connected device based on the protocol information.

For example, the device manager 100 can identify a converter that is being used and can detect the packets coming out of the converter to identify the underlying protocol, such as an IP protocol. The device manager 100 can know in context of other identified features that the main reason for use of a converter from the underlying protocol, such as IP, is because there is a connected NMEA serial device at the back end. For example, the protocol from the connected device to the converter could be serial NMEA and the protocol coming out could be NMEA on top of TCP/IP. The device manager 100 can deconstruct the IP packets to pull out the NMEA protocol, construct a query using packets that are NMEA on top of TCP/IP, and send the constructed packets to the converter in a subsequent query. The converter can convert the constructed packets to NMEA on the serial interface, which allows the device manager 100 to send a query to the device to obtain features of the connected device. Thus, the device manager 100 can send packets that take advantage of the NMEA serial protocol to query the connected device for additional features. Upon determination of the connected device, the topology builder 106 can add the converter and connected device to the topology graph 108.

Method of Operation

Figure 2:
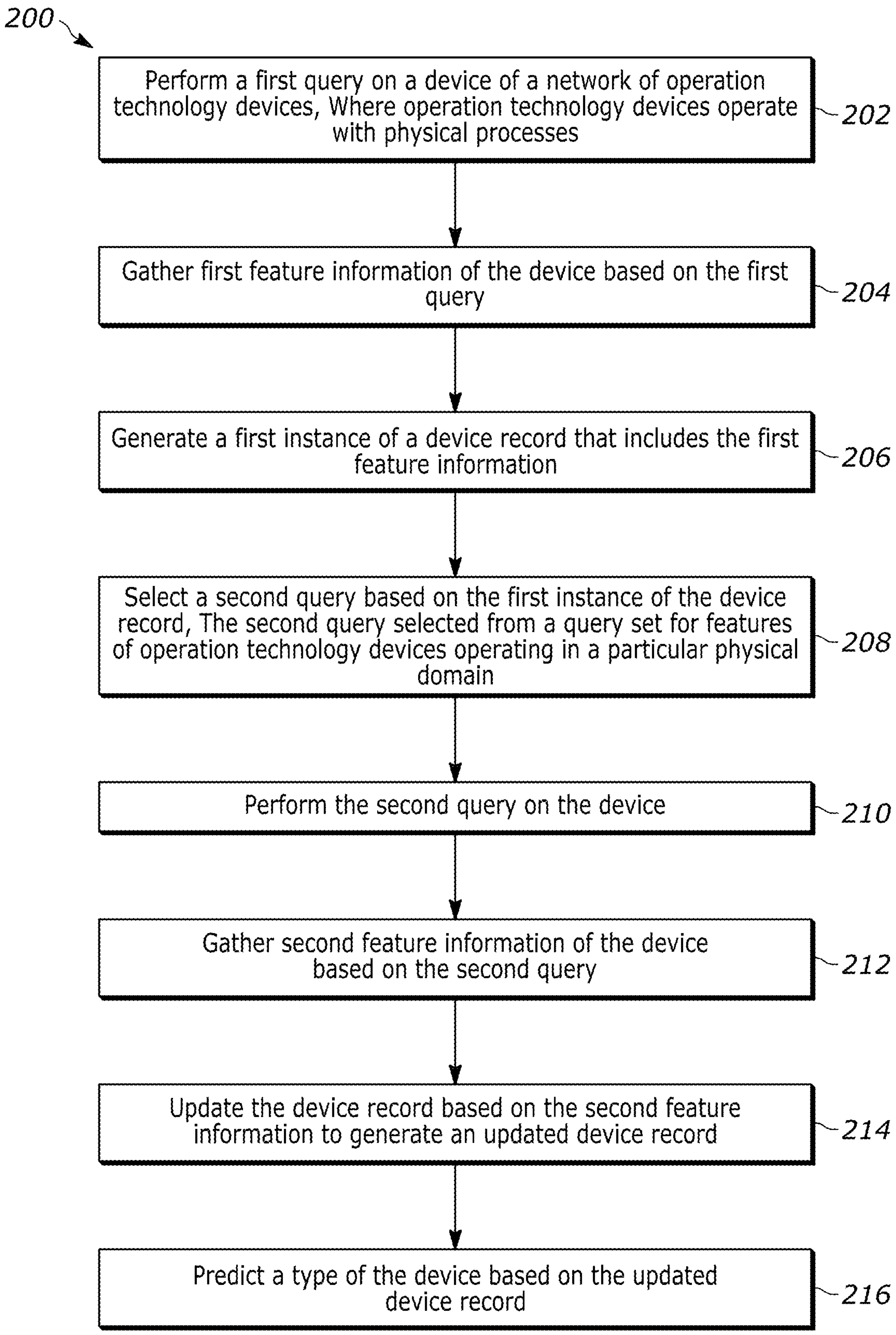
FIG. 2 is a flowchart illustrating a method in accordance with a possible embodiment.

FIG. 2 is an example flowchart 200 illustrating a method of operation of the bridge network device manager 100 according to a possible embodiment. At 202, the method can include performing a first query on a device of a network of operational technology devices. Operational technology devices are hardware and software systems devices that monitor and control the physical world. For example, an operational technology device operates with physical processes by monitoring or controlling the physical processes, controls something physical, receives information from the physical world, monitors and controls how physical devices perform, detects or directly changes physical attributes, receives sensor data, measures physical characteristics, and and/or can otherwise operate with physical processes. As a particular example, an operational technology device can be a maritime charting system that is a computing device with a display that receives information, such as location and speed information, from other devices and then charts and displays the information. An operational technology device can also be a radar, a rudder control system, a Global Positioning System (GPS) sensor, a velocity sensor, and/or any other operational technology device. The network can also include information technology devices. Thus, the network can include physical domain-specific operational technology devices and information technology devices.

At 204, the method can include gathering first feature information of the device based on the first query. At 206, the method can include generating a first instance of a device record that includes the first feature information. A particular device record is an instantiation of the feature set that corresponds to a particular operational technology device.

At 208, the method can include selecting a second query based on the first instance of the device record. The second query is selected from a query set for features of operational technology devices operating in a particular physical domain. The particular physical domain can be a maritime vessel, an aircraft, a factory, or any other physical domain.

At 210, the method can include performing the second query on the device. At 212, the method can include gathering second feature information of the device based on the second query. At 214, the method can include updating the device record based on the second feature information to generate an updated device record. At 216, the method can include predicting a type of the device based on the updated device record. The method can be repeated by performing additional queries and making updated predictions based on information received in each query.

In a possible embodiment for selecting the second query, the method includes predicting a first type of the device based on the first instance of the device record. The method includes updating the first instance of the device record based on the predicted first type of the device. Selecting the second query at 208 includes selecting the second query based on the updated first instance of the device record.

A possible example of selecting the second query can involve selecting the second query based on identifying the device is an intermediate device. In this example, predicting the first type of device includes predicting that the first type of device is an intermediate device that converts a first communication protocol of a connected device to a second communication protocol. Selecting the second query at 208 includes selecting the second query based on the first communication protocol and the second communication protocol. Gathering the second feature information at 212 includes gathering the second feature information of the connected device based on the second query. Updating the device record at 214 includes storing a connected device record based on the second feature information. Predicting the type of the device at 216 includes predicting the type of the connected device based on the connected device record.

A possible embodiment involves the device record including a feature set. The method can include selecting the first query from a query set for features of operational technology devices operating in the particular physical domain. Each instance of the device record includes a predetermined feature set of features of operational technology devices operating in the particular physical domain. Each instance of the device record indicates whether features of the predetermined feature set are present. The feature set of the device record can include fields for each feature in the set. The fields can indicate the presence or absence of a corresponding feature, such as by using a one or zero. The fields can also include alphanumeric text of the features, such as the protocol used by the device, the port, such as at least one port number, used by the device, the operating system of a device, the manufacturer of the device, the model of the device, the IP address of the device, the predicted type of the device, and other information. The fields can also indicate whether the information for a respective field is unknown.

In a possible embodiment, the query set is built to interrogate for features of operational technology devices operating in a particular physical domain. In a possible embodiment, the predicting is performed by a classifier trained on data collected from a cyber-physical testbed set that is based on maritime hardware equipment configured into a representation of a bridge of a ship.

In a possible embodiment, the second query can be a query for an operational technology device communication protocol. An operational technology device communication protocol can be considered an industrial communication protocol. The second query can also include a query for a particular port number, a query for an operating system, a query for a model/version, a query for a manufacturer, a query for a communication protocol, and any other query for a feature of an operational technology device.

In a possible embodiment, the particular physical domain is a vessel, the device is a vessel operational technology device coupled to a bridge of the vessel, and the second query is a query for a vessel operational technology device communication protocol of the vessel operational technology device. For example, the vessel operational technology device communication protocol can be a National Marine Electronics Association (NMEA) protocol or an Automatic Identification System (AIS) protocol.

In a possible embodiment, the method can include creating a network communication flow graph of a network of operational technology devices. The network communication flow graph includes a first network connection that uses a first communication protocol between a first device and an intermediate device, and a second network connection that uses a second communication protocol between the intermediate device and a second device, where the second communication protocol is different from the first communication protocol.

At least some embodiments can provide one or more non-transitory computer-readable storage media storing instructions that, when executed by one or more processors, cause the operations of methods in the disclosed embodiments.

Maritime Asset Manager

In some embodiments, the network device manager 100 operates in the context of a maritime vessel bridge, such as an asset profiler for a maritime vessel bridge. Features of these embodiments can be incorporated into the above-identified embodiments. In these embodiments, the device manager 100 can include the feature extractor 110 that performs a first query on a device of a network of operational technology devices coupled to the maritime vessel bridge. The operational technology devices operate with physical processes of the maritime vessel. The feature extractor 110 also performs gathering information of a feature of the device based on at least the first query, and generating a device record that includes the feature in a set of features.

The device manager 100 can include a database, such as the dataset 112, that stores the device record. The device manager 100 can include the encoder 114 that generates a first encoded data based on the set of features. The device manager 100 can include the classifier 116 that predicts a type of device based on the first encoded data by comparing the first encoded data to stored device feature data. The device manager 100 updates the set of features in the device record with information of the predicted type of device.

The feature extractor 110 selects a second query based on information of the predicted type of device, the second query selected from a query set for features of maritime vessel operational technology devices, performs the second query on the device, and gathers information of an additional feature of the device based on the second query.

The device manager 100 updates the set of features in the device record with the information of the additional feature. The encoder 116 generates second encoded data based on the set of features including the additional feature. The classifier 116 predicts an updated type of the device based on the second encoded data by comparing the second encoded data to the stored device feature data.

While many embodiments are not limited to a maritime bridge environment of a maritime vessel bridge, such a domain is provided as an example for illustrative purposes. A maritime bridge environment is a heterogeneous ecosystem of complex systems for various maritime operations. As part of new requirements by the International Association of Classification Societies (IACS), ship operators must now maintain an asset inventory aboard the vessel specifically to improve its cyber safety. A ship-specific version of the device manager 100, such as a maritime asset profiler, not only identifies and records the devices present automatically but also provides an in-depth analysis of their properties and characteristics in an intelligent and user-friendly manner. As cyberattacks increase in the maritime industry, proper testing of ship systems is essential, to ensure the vessel remains secure and the risk of a cyberattack is minimized. A device manager 100 for the bridge environment serves as a tool for profiling the devices, helping personnel make faster, and well-informed decisions, and can be a component of a wider audit framework.

This device manager 100 can also be referred to as ship bridge asset profiler or an asset profiler for penetration testing in a heterogeneous maritime bridge environment. The device manager 100 is used to automatically identify all devices on the bridge of a vessel. In addition, the device manager 100 provides information on the devices, such as using a generated PDF report or display that includes graphs and charts. In one implementation, the device manager 100 uses a classifier algorithm, and the information it provides enables the auditor or pen tester to perform testing and automate audits, while also providing comprehensive information that engineers and mariners can use to comply with regulations.

Maritime Asset Profiler Introduction

Maritime is a complex billion-dollar industry and a crucial part of the global economy. Countries such as the United States import around 90% of the goods by sea, and China is a heavy importer of resources like oil and iron. With the advent of technology, the complex systems on board vessels have adapted new functionalities to make operations easier and better. Along with network connectivity, several emerging topics like Artificial Intelligence (AI) and Machine Learning (ML) emerged in the traditional operating environment. While these often provide better safety, usability and comfort, it introduces several new challenges, like cyber vulnerabilities or flaws, to onboard critical systems, which then can be exploited by cyber criminals.

Cybersecurity audit is a process that helps identify digital threats within a defined scope. This provides a comprehensive review of systems vulnerabilities, its compliance with policies and regulations, and an assessment of cyber risks. One of the first steps in a cyber security audit is information gathering, to identify the scope and assets. The Information Assurance for Small and Medium Enterprises (IASME) Maritime Cyber Baseline developed by the IASME consortium in November 2021 and supported by The Royal Institution of Naval Architects (RINA), is an audit process that uses a checklist that will allow ship owners and operators to show compliance with security controls and process. Under the scope of assessment in the audit process, the checklists ask for asset registers for all information and operational technology (IT/OT) along with their make, model, and other characteristics. The assessment also requires listing all the networks on the vessel, their functions, how they are segmented, routers, firewalls, and gateways.

Identifying systems and having an equipment inventory are also required to comply with certain requirements, standards, and policies like Unified Requirements (URs) by the International Association of Classification Societies (IACS). IACS is an organization of classification societies that establish technical standards for vessels and the maritime industry. IACS produces Unified Requirements (URs) that are adopted resolutions on minimum requirements on matters covered by classification societies. To ensure cyber resilience onboard vessels, IACS has produced two new URs, UR E26 (which deals with the cyber resilience of ships) and UR E27 (which deals with the cyber resilience of onboard systems and equipment) came into force from the 1st of January 2024. Both of these URs are applicable to vessels constructed on or after 1 Jan. 2024. The UR E26 document mentions minimum requirements to establish a ship as cyber resilient while UR E27 deals with the establishment of cyber resilience for the systems on board rather than for the vessel itself.

The first goal of 'Identify' in UR E26 mentions identifying all the onboard Computer-Based Systems (CBS), their interconnections, interdependencies and resources involved. This includes creating and maintaining an inventory of all CBS onboard and the networks involved, during the entire life of the ship. The UR also stipulates having the system details such as manufacturer, brand, model, and logical connections between them on the network. As part of section 3.1 of the UR E27 document, information regarding equipment, hardware, operating systems, configuration files, and network flows, as well as plans and policies, are to be submitted to the classification society for review and approval. This is followed by a requirement to maintain an inventory of the name of the device, manufacturer, model, and versions of software, as well as a software inventory that includes at least installation dates, version numbers, maintenance and access control policies.

Considering that there are more requirements and guidelines introduced in the maritime sector to improve cyber security onboard, which requires having a proper asset management process, the device manager 100 identifies and provides information about the assets/devices on board to the tester/auditor who monitors the process. Additionally, the device manager 100 helps to audit/identify any unused and unwanted devices connected to the network that could be a point of weakness for the entire environment. The device manager 100 generates a condensed, user-friendly PDF report of all asset and network information found and profiled, which can be used in association with maintaining the asset register. The device manager 100 can also be integrated into automated penetration testing systems to help in the testing of systems for vulnerabilities.

Asset Identification

Figure 3:
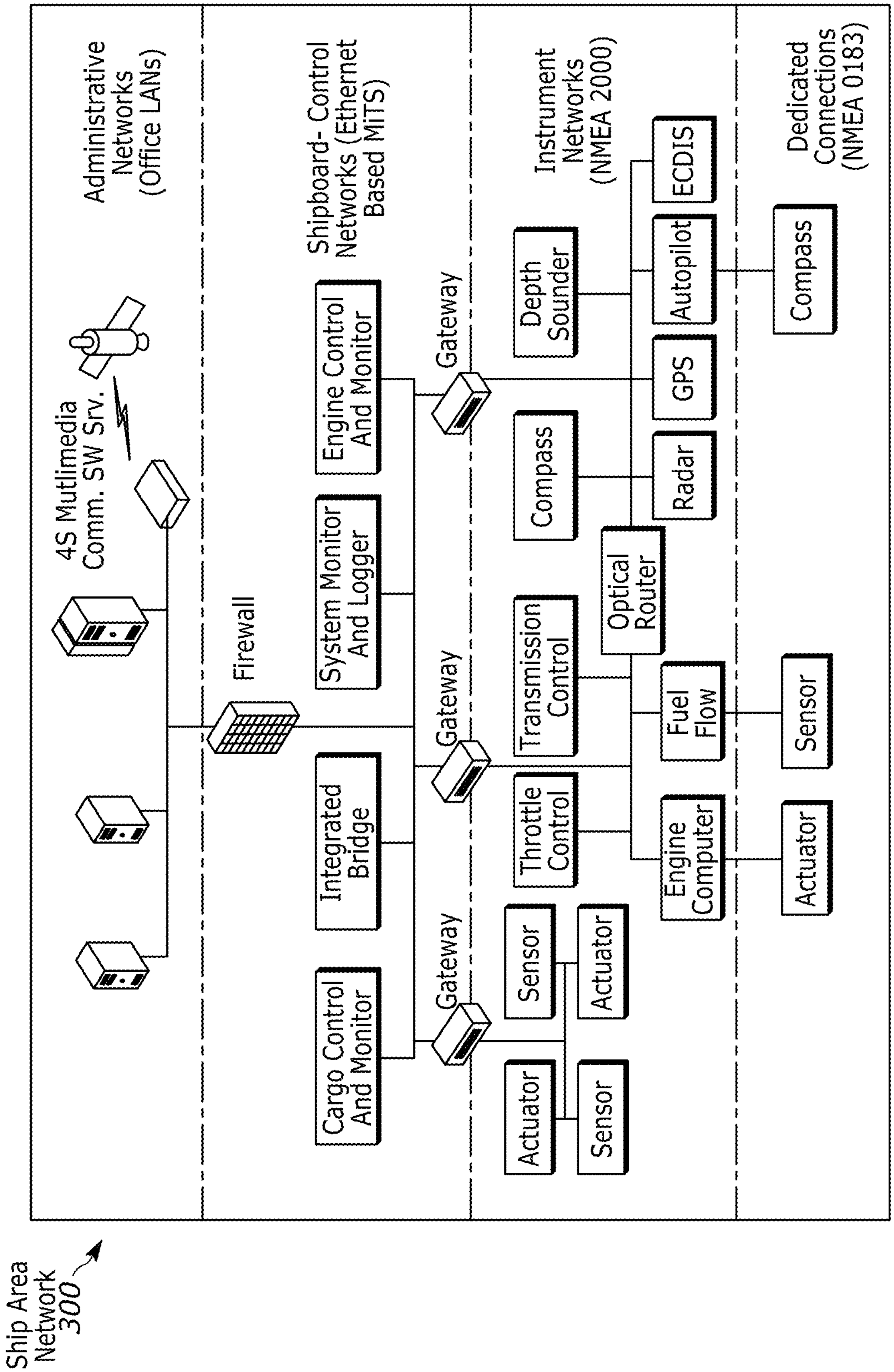
FIG. 3 is an example illustration of a ship area network according to a possible embodiment.

FIG. 3 is an example illustration of a ship area network 300 according to a possible embodiment. There are many types of networks, especially in complex heterogeneous environments. Different systems communicate with different protocols, creating separate subnetworks (often IT or operational technology (OT) specific) or clusters of systems. Assets in a ship environment include equipment, communication interfaces, and networks that are essential for the smooth operation of the vessel. Each organization defines the word "asset" differently, but in this disclosure, the term refers to any equipment networked on the bridge of a vessel for bridge operations (e.g., navigation, emergency communication) on a network and has an assigned IP address for communication.

The bridge of a vessel typically includes a variety of equipment, including an Electronic Chart Displaying and Information System (ECDIS), a VDR, an Automatic Identification System (AIS), RADAR, Very High Frequency (VHF) equipment, Global Maritime Distress and Safety System (GMDSS), a compass, a gyroscope, and more. Safety and security standards for vessels mandate certain equipment, but the type of equipment may differ according to the class, size, and type of vessel. For example, Chapter V of Safety of Life at Sea (SOLAS)-Safety of Navigation requires a VDR to be fitted on vessels constructed on or after 1 Jul. 2002, or ro-ro passenger ships constructed before 1 Jul. 2002 or ships other than passenger ships, of 3,000 gross tonnages and upwards constructed on or after 1 Jul. 2002. However, the regulation mentions the vessels may be fitted with an S-VDR (Simplified VDR) that captures less data than a VDR, considering the size and type of vessel. This difference in the equipment type changes the scope and characteristics of management and testing. Therefore, the use of the device manager 100 to identify devices and profile them is a useful reconnaissance tool for engineers/mariners maintaining inventories to comply with regulations. More use cases are discussed below.

Asset Maintenance and Inventory Listing

An asset inventory provides useful situational awareness for maintenance and in the event of an incident. A device inventory including information about the device type, IP address, MAC address, open ports, manufacturer information, and version number makes it easier for those who have responsibilities to manage those devices. For example, it allows them to identify any obsolete/unused devices connected to the network. The removal of such devices reduces the network's threat surface without affecting operations. According to a 2020 Global Networks Insights report, based on assessments conducted on more than 800,000 IT network devices, 47.9% of the network assets of organizations were obsolete and on average have twice as many vulnerabilities per device (42.2) compared to ageing (26.8) and current ones (19.4). Therefore, the device manager 100 allows seafarers or asset owners to better understand their systems and maintain the asset inventory for compliance with regulations. The following table describes the IACS URs that may be addressed using the device manager 100.

TABLE 1

IACS URs

| UR | Requirement |
|---|---|
| UR E26 | For each CBS: a description of purpose including technical features (brand, manufacturer, model, main technical data);<br>A block diagram identifying the logical and physical connections (network topology) among various CBSs onboard, between CBSs, and external devices/networks and the intended function of each node;<br>For network devices (switches, routers, hubs, gateways etc.,) a description of connected sub-networks, IP ranges, MAC addresses of nodes connected, or similar network identifiers;<br>The main features of each network (e.g. protocols used) and communication data flows (e.g. data flow diagram) in all intended operation modes;<br>A map of the physical layout of each digital network connecting the CBSs onboard, including the onboard location and network access points; |
| UR E27 | Detailed list of equipment included in the system, may include Name, Brand/Manufacturer (supplier), Model or reference, some devices contain several references, Current Version of the operating system and embedded firmware (software version) and date implemented;<br>Equipment hardware details (i.e., motherboard, storage, interfaces (network, serial) and any connectivity);<br>A list of software, including: Operating System/firmware, Network services provided and managed by the operating systems, Application Software, Databases, Configuration files;<br>Network or serial flows (source, destination, protocols, protocols details, physical implementation); |

TABLE 1-continued

| IACS URs | |
|---|---|
| UR | Requirement |
| | Network security equipment (including details mentioned above). E.g. traffic management (firewalls, routers, etc.) and packet management (IDS, etc.); Secure Development Lifecycle Document; Plans for maintenance of the system; Recovery Plan; System Test Plan; Description of how the system meets the applicable requirements in E27 (i.e. Operation Manual or User Manual, etc.); Change Management Plan. |

Information Gathering by Pen-Testers/Auditors

Maritime cyber security for vessels is a relatively new discipline protecting onboard systems and surrounding infrastructure. Understanding gaps and flaws is a key step for this discipline. Penetration testing or pentesting is a process where authorized personnel attack the system, within scope, to find exploitable vulnerabilities and threats. While carrying out penetration testing in a live, complex environment with sector-specific devices, a lack of system knowledge can introduce challenges and disrupt operations. Traditionally penetration testing was used to test IT systems, whereas these days OT penetration testing, and IT that monitors or controls OT, are becoming more prevalent.

One of the first steps in penetration testing is information gathering to identify the scope and assets. In an IT environment, this is fairly simple, as most devices would be computers, networking devices or small IoT devices. However, in a vessel's bridge environment, networked devices are more bespoke and for various purposes, which makes it more difficult but still necessary to understand the systems and networks in place. Currently, this is done manually, where the pentester or auditor goes on board a vessel. This is time-consuming for pen testers/auditors and requires appropriate technical qualifications and certifications. With an automated tool like the device manager 100, not only does the tester not need to be familiar with all the devices and protocols in the sector they are testing, but the tool can guide a non-expert and be faster than expert manual asset inspection. On a ship's bridge, equipment may also be hidden out of sight, which makes the use of the device manager 100 a less intrusive and invasive process.

Network topology generators for IT systems identify, list and visualize networks. Auditors use a network topology generator tool to view the status of their networks and monitor them. The tool takes in the IP address of a seed device, typically the main switch in the network, scans for devices, and draws a map with IP addresses. Network topology generators are used in IT environments, where the common devices found are routers, switches, servers, firewalls, VMware hosts, and wireless access points. These tools are used by network administrators in IT and office environments where the devices are mostly PCs, routers, firewalls and network gateways. They do not include domain-specific devices or those that do not have an Internet connection. They have further challenges with devices outside the scope of the identification system, devices from the same manufacturer not being identified, the ability to dynamically grow datasets and to learn new devices, and the robustness of features.

The Device Manager

The device manager 100 is responsible for detecting ship systems to compensate for the gaps in IoT and IT systems.

Components and Tools

The device manager 100, such as an asset profiler, can include the following components, tools, and terminologies.

Topology Builder 106: This module creates a network communication flow graph. Upon receiving a network configuration in the form of a network domain address, the device manager 100 captures network traces as Packet Capture (PCAP) files. These are processed by the topology builder 106, which creates directed topology graphs 108 depicting network connections and how systems communicate.

Feature Extractor 110: The network information from the topology builder 106 is passed to a feature extractor 110 that scans the network, gathering information about open ports, manufacturers, and operating system, and extracts their features. Features are then incorporated into a dataset 112.

Dataset 112: Feature datasets can be fed into Machine Learning (ML) modules to analyze data. ML and Artificial Intelligence (AI) can be used for various purposes, including predicting classes of ships, and traffic density using millions of AIS data records, reducing fuel emissions and avoiding collisions. The dataset 112 is created for the classification, profiling, and testing of onboard hardware electronic equipment on ships.

Encoder 114: The encoder 114 converts and prepares the data in the dataset to be used by the classifier 116. When a new test is carried out, the information is extracted from the dataset 112, and fed into the encoder 114, which converts it into information usable by the classifier 116.

Classifier 116: The classifier 116 is used for classifying all the devices found. A random forest classifier has been found to be a useful classifier for yielding accurate results while working robustly with limited data, but other classifiers can be readily used. The classifier 116 creates profiles 118 for all the devices found in the network and the output is fed back to the dataset 112.

Scikit-learn (Sklearn): Sklearn library was used to create the training and testing sets.

Model Validator 120: The model validator module 120 validates the model and calculates the classification accuracy score. The accuracy score acts as an indicator of the model's performance, with higher accuracy scores indicating that the model is better able to identify devices accurately and distinguish between different devices.

Logger 122: The device manager 100 will also automatically generate graphs, heatmaps and other images using the visualization and logger 122 to visually depict information about the assets which will be included in a report produced after the entire testing process.

Network Communication Topology Builder

The device manager 100 first performs network reconnaissance and creates a network communication topology map for the devices found by using the topology builder 106. Network communication topology defines how nodes or devices are connected to each other and communicate. This can be a useful step, and in addition, topology graphs provide a comprehensive view of the network infrastructure to ensure that the devices are functioning properly. The topology builder 106 can be kept simple using directed graphs. To build the topology, the network traffic from the environment is captured and translated into graph format with nodes and edges where the directed edges represent the source and destination of packets. The produced graphs provide a visual representation of network traffic and its connections, which allows auditors or engineers to comprehend a high-level view of the environment. Using the network domain address as input, this framework tool will start capturing network traffic in the form of a PCAP file for a specific period of time, which is then parsed and converted to graphs. For each new IP address in the PCAP file, a node is created in the graph for the source IP address and the destination IP address, connected by an arrow between them to represent the packet flow direction, if the node already exists, then the connection is marked between existing nodes.

Figure 4:
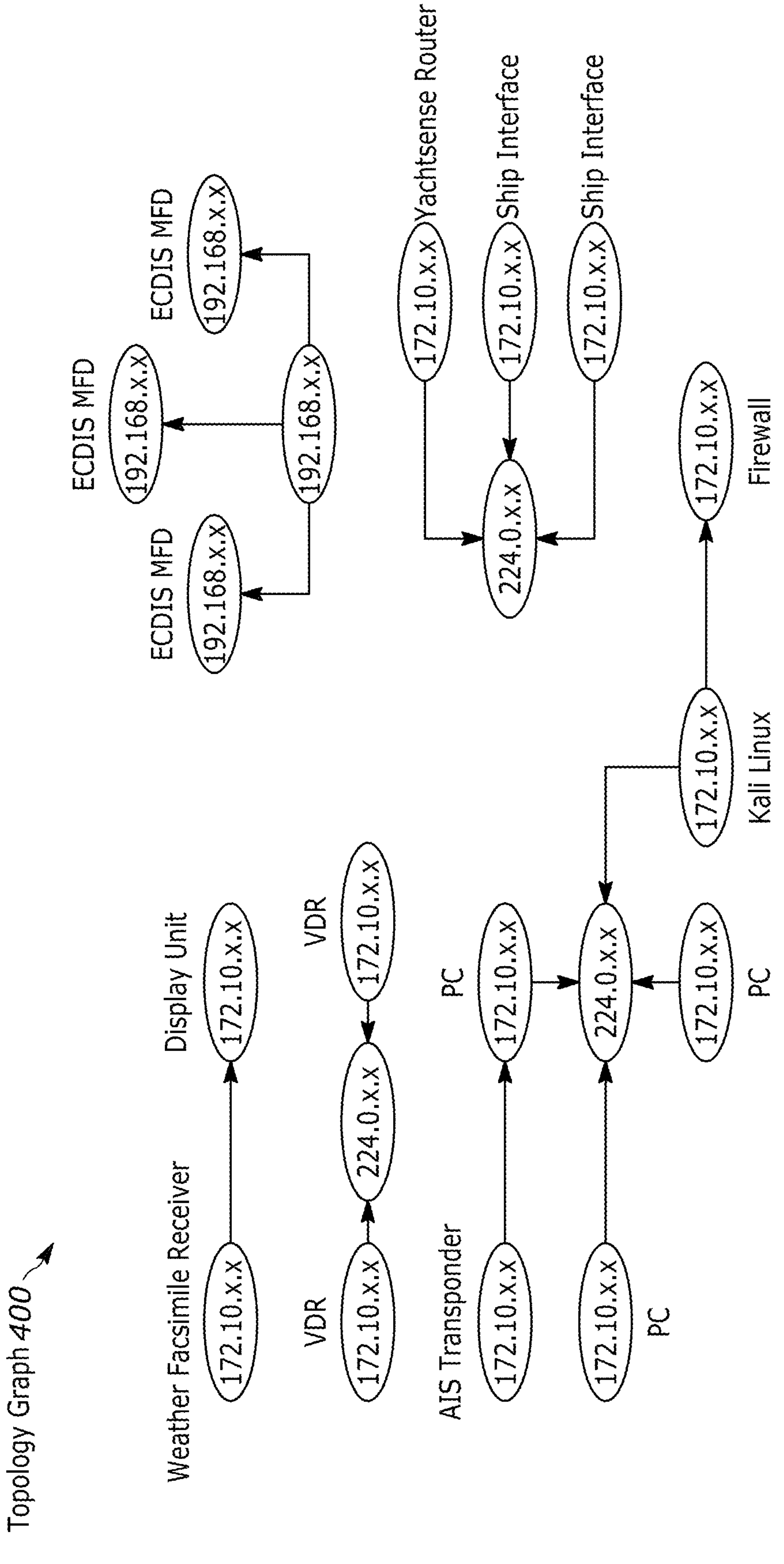
FIG. 4 is an example illustration of a network packet flow topology graph according to a possible embodiment.

FIG. 4 is an example illustration of a network packet flow topology graph 400 according to a possible embodiment. Once all the entries are drawn as a graph by the topology builder 106, the entire communication topology can be visualized, as shown by the topology graph 400. Traditionally, this approach captures the network for only a limited time period and is static in nature during the testing period. At least some disclosed embodiments can provide for dynamic creation of the topology graph, which changes the graph according to the auditor's needs.

Profiling

The next part of the device manager 100 identifies the devices it had found in the ship's bridge network and profiles them based on their characteristics using a classifier, such as a random forest classifier or other classifier.

Dataset

For maritime bridge device identification, the dataset 112 has data regarding specific characteristics of those devices that will enable the differentiation of maritime bridge-specific devices and generic IT/OT devices. Datasets for profiling maritime equipment do not exist publicly, and therefore a new dataset was created to test this framework. As it is challenging, disruptive, and risky to conduct a live scan on a working ship's bridge, data was collected from a cyber-physical testbed set within the Cyber-SHIP lab at the University of Plymouth. Cyber-SHIP is a maritime-cyber research facility that configures real maritime hardware equipment into an electrically accurate representation of a ship's bridge that can be used for testing. The equipment and software were configured to act as a ship's bridge in the experiments, and therefore the network data collected is not simulated and therefore has high fidelity.

As the framework is validated with collected data, the scope of the dataset can be determined before collecting data: (1) how much data is required, (2) what types of data will be collected, and (3) what the expected output will be. One aspect of identifying maritime equipment is understanding how it differs from its IT counterpart in terms of operations and settings. To account for this, the data attributes, such as features, gathered were device, different port numbers, operating system, IP address, device type, and manufacturer. As disclosed above, other features can be gathered. A list of common vulnerable network ports was considered for the port numbers attribute. A few of the top open TCP ports include port 80 (Hypertext Transfer Protocol or HTTP), 23 (Telnet), 21 (File Transfer Protocol or FTP), 22 (Secure Shell or SSH), 25 (Simple Mail Transfer Protocol or SMTP), 445 (Microsoft SMB), 53 (Domain) and UDP ports include port 139 (Netbios-ss), port 445 (Microsoft-DS), port 161 (Simple Network Management Protocol or SNMP), port 123 (Network Time Protocol or NTP), etc. This originally led to having 19 port numbers in the dataset as attributes, and this number can change as further information is acquired. Based on whether the port is open or closed, these attributes were denoted with values of either '1' or '0' within the database.

A prediction is only as accurate as historical data and missing values can affect the outcome as when a dataset is populated. Thus, there is the possibility that some values will be missing. A system upgrade, for example, would have little historical data. Since this can lead to difficulties in prediction accuracy, these values are marked as 'unknown' when the device manager 100 lacks confidence. The auditor can then examine them later if necessary, and there is less chance of the profiler tool misguiding an auditor. In addition, the different types of data contained in the dataset can be considered. While port numbers are numeric, operating system data and manufacturer data are alphanumeric categorical data. To make the data consistent, the categorical data can be encoded into dummy variables using the encoder 114 that can be optimized for the classifier 116 in machine learning.

Classifier Setup

Classifiers, such as the random forest classifier can be useful classification of devices on a ship network for several reasons. Firstly, due to the limited amount of data for profiling ship systems, the classifier 116 can work with a limited dataset but still yield high accuracy. While this can work with IT/IoT devices, disclosed embodiments work on the less conventional systems in a ship's bridge environment. For example, a random forest classifier is a supervised learning algorithm which is an ensemble of multiple decision trees. Decision tree classifiers can be used in disclosed embodiments because they can be simple and good classification algorithms. However, they may perform overfitting. Overfitting occurs when the model tries to fit the training data to increased accuracy, that is, attempts to memorize the whole training data such that it becomes unstable with the introduction of new data. This aspect of decision trees can be rectified by random forests. During the process of building and splitting the nodes in trees, a random forest generates multiple decision trees based on random sample sizes and a random number of features. Then, the aggregate of all the created decision tree outputs is calculated to classify the data thus eliminating any bias and chances of overfitting.

In addition to the physical hardware in the Cyber-SHIP lab, a virtual machine running Kali Linux OS or any other OS can be used to collect data from the configured network. The machine can be virtually connected to the lab's ship network, which the topology builder 106 mapped out automatically. The resulting topology can be used to launch a network port scan using a scan tool, such as a tool in the feature extractor 110, to determine the hosts in the network and their communication protocols. The scan tool can determine which devices are active and up. Once the ping scan is complete, each device from the host list is scanned for open ports and services. The obtained results can be filtered and encoded into the dataset, populated from the scan tool and topology builder results.

Model Building

To build and test an accurate model, the dataset can be divided into training and testing subsets. Training data is the initial set of data that is fed into the model for learning and finding patterns between the data. That is, it is the historical data that teaches the model to make accurate predictions. The testing data is the set of data used to measure or validate the accuracy of the model. It is the unseen data that can be fed to the model to validate the model. In an illustrative example, the dataset was split into training and testing sets with a ratio of 70:30 using train test split ( ) function in the Sklearn library. That is 70% of the data is split into a training set while 30% will be reserved for testing. The input of the model is the selected attributes from the dataset, and the output is the 'Device' attribute. This again is useful when there is little historical data.

The random forest classifier was originally built with 100 n estimators, where the number of n estimators denotes the number of decision trees to be built before taking the average of all the outputs and making the prediction. Model fitting can measure how well the model works with similar data to that of trained data and a model can be well-fitted, over-fitted or under-fitted. Well-fitted models provide accurate predictions or output, while the over-fitted model matches the trained data too much and the under-fitted model does not match at all. An example random state of value 42 can be provided as the seed of randomness to make sure that the split datasets are the same for every execution. Once the model was trained and fitted, the accuracy score of the model was obtained using the reserved test values and predicted values for 'Device' attributes. It is noted that any particular numbers mentioned in different embodiments were used for initial testing and any numbers can be used depending on the desired implementation.

Classification

For each host found, the model is created, sequentially by IP address, trained and fitted. Once the model has been fitted and tuned using hyper-parameters (explained in more detail below) the model can be used for profiling. When a new host is identified in the network 102 using the topology builder 106, the details and characteristics of the host are identified and extracted. This information is written to the dataset 112 with the 'Device' attribute value set to 'dummy' or a like value. This information is then encoded to numerical values that act as the input for the model in the form of a list. This input list is then fed into the classifier 116 to make the prediction about the device type and the output is the value for the 'Device' attribute of the dataset 112. Once this value is predicted, the 'dummy' value in the data frame is replaced with the predicted output and then written to the dataset 112. This enables continuous growth of the dataset 112 and thus enables learning. This process is repeated for all the hosts identified and at the end of profiling for all devices, the average accuracy score for the model is also calculated.

Results and Findings from the Profiling

An asset can be profiled, and the results can be shown in a way that both the technical auditor/tester and the engineer/mariner can understand. To facilitate this, the results can be automatically generated in a PDF file. The experiment set-up in the CyberSHIP lab had a bridge network with an average of 30 devices, with a variance of plus or minus 2 devices, depending on the configuration. The bridge network's domain address was input into the device manager 100 and the entire process of automated profiling took around 40-45 minutes to complete and produce the PDF report. An example machine that executed the device manager 100 tool was a Kali Linux virtual machine (VM) of 2048 MB base memory, while the Windows machine that hosted the Kali VM was of Microsoft Windows 11 OS with 32 GB RAM. Results and analysis from the profiler are automatically generated and visually presented in the report by using graphs and charts described below. The model was created with an understanding that maritime equipment has different characteristics than IT devices, such as different open ports for functionalities. It was also found that certain devices by specific companies had dedicated open ports for configuration and setup. The following results were produced from the analysis of the histogram generated by the profiler.

- The majority of the devices had a web configuration server hosted on port 80, out of 29 devices, 20 had port 80 open.
- All serial-to-IP converters by USR IoT company had port 1501 open which is assigned to Satellite-data Acquisition System 3 while the ones by Moxa Technologies had port 4000 open along with other ports like port 80 for web configuration.
- Another interesting finding was that the VDRs had all open ports as any Windows PC even port 3389, used for Remote Desktop Protocol and port 445 of Windows SMB, which implies that a VDR might behave like a PC and the vulnerabilities and exploits applicable to the Windows system might affect this system as well.
- All the Moxa serial-to-IP converters had port 4900, which is used for firmware upgrade of the device. There are several firmware-related vulnerabilities published in the Common Vulnerabilities and Exposures (CVE) database for Moxa NPort devices including those that can be crafted and sent via firmware upgrade ports.
- Navigation devices like AIS transponders and Weather facsimile receivers by Furuno Electric manufacturer have port 10010 open, which is used for broadcasting AIS and NMEA messages.

Tuning Parameters and Validation

Decision tree algorithms can be prone to fitting to extremes and random forest classifiers may reduce these extremes to some extent by adding randomness, but they may not be free of it entirely. To achieve a balance between overfitting and underfitting, the parameters that affect the accuracy and performance of the model can be adjusted and tuned, which is called hyper-parameter tuning. Some of the hyper-parameters used for tuning include n estimators (number of decision trees in the forest), max depth (maximum number of levels allowed in a tree), min samples split (minimum sample required to split a node), min samples leaf (minimum number of samples at leaf nodes) and max features (maximum number of features used in splitting the nodes). Choosing values for these hyper-parameters can be done with practical experimentation, trying random values and default values to see how the model performs with those settings. This process can be tiring and time consuming. Therefore, another method can be to use validation methods like K-fold cross-validation and validation curves, which help to identify optimal hyperparameters for the model and diagnose fitting issues. The validation curve plots the performance metrics or the accuracy score of a given model for training and testing data visually against a chosen range of parameters. Analyzing the graph can help in identifying the parameters that may cause underfitting or overfitting of the model.

The model was first built with 100 n estimators (default value) and all other hyperparameters set to the default value.

The average accuracy score for the model with 100 n estimators was 0.988905 and the entire process of classifying all the devices found in the network took 46 minutes. To further refine and tune the model to ensure higher accuracy scores, as well as account for fitting issues and unique features of the devices, validation curves were plotted for different parameters. If the training score and the validation score lines are low, the model might be underfitting and if the training score is high while the validation score is low, the model might be overfitting. Thus, the optimal value for the hyper-parameter might be the one point where the distance between these lines is shorter and the accuracy is maximum. The hyper-parameters are described in further detail below.

n estimators: n estimators define the number of decision trees built for the forest. To cross-validate and identify the possible values for the n estimators, a validation curve was plotted using 2 cross folds and the values for n estimators considered were 10, 25, 50, 100 and 150. In both the graphs, the accuracy score of the cross-validation curve is maximum for the value 50, and then slowly decreases to a stable value. It can be noted that the accuracy score does not change after a particular n estimator value, which means changing the n estimator value does not impact the accuracy score and might indicate overfitting. The accuracy value changed at 25 n estimators, and thus this value was considered possible for the model without subjecting the model to overfitting issues. Choosing a lower value for the n estimators may decrease the computational time while having an effect on the accuracy score.

max depth: Max depth indicates the maximum number of levels the decision trees can have. If set to default value, the model will split until the node attains 100% purity or all its data belongs to the same class. To identify a possible value for the max depth parameter, a validation curve was plotted using two cross-folds and the values for max depth considered were 5, 10, 15, 20, 25. The train accuracy score and validation score increased sharply and then stabilized after the max depth value of ten. Therefore, ten can be a possible value for the max depth parameter, as any greater values may not have an effect on the accuracy of the model.

min samples leaf: Min samples leaf value is the minimum number of samples to be present at a leaf node. If after splitting a node, the internal leaf node has samples less than this value, then it will not be considered as a leaf node while its parent will be considered as the leaf. This value helps in restricting the size of the tree and the number of levels it grows. Validation curve graphs using the values 2, 4, 6, 8, and 10 were plotted. The default value of min samples leaf in Sklearn is one, which means the leaf node must have at least one sample. The plotted graph showed that the accuracy score value decreases consistently as the min samples leaf value increases. An acceptable accuracy score can be achieved when the min samples leaf value is set to two, therefore this value can be chosen as a possible value.

min samples split: Similar to the min samples leaf, min samples split represents the minimum number of samples to be present at a node for splitting to happen. After splitting a node, if the number of samples in the internal leaf node is less than this value, then the internal node will not be split. Otherwise, splitting will happen iteratively until the node is pure. This parameter is also used to limit the growth of the trees and avoid overfitting problems. Validation curve graphs using the values 2, 4, 6, 8, and 10 were plotted. Similar to the previous graphs, the validation curves for this parameter also decrease with the increase in the hyperparameter value. The default value of min samples split in Sklearn is two and that value is retained as a possible value, as the accuracy score is acceptable compared to when other values are used.

Validating and optimizing the model using hyperparameter tuning is useful. Using the hyperparameters derived from the tuning approach, a new random forest classifier model was created. Its accuracy score was 0.9867 while the accuracy score of the model with 100 estimators was 0.98899. The new model took an average of 37 minutes to complete the profiling process, whereas the first model with 100 estimators took 46 minutes. Results showed that when the estimator values were lowered to 25, accuracy decreased by a minimal value, however, process completion was faster. Therefore, the classifier model can be selected based on the purpose of the model considering the accuracy scores and time, while avoiding fitting problems.

Visualization and Reporting

A penetration tester typically produces security reports manually, highlighting the testing environment, risks it possesses, its vulnerabilities, and possible mitigations. The device manager 100 does this automatically and the quality of information can be the same, or better than the manual way. Automation makes the pentester/auditor's job easier and lets them focus on other aspects of their job. It is common that typical reports are very technical in nature, and an individual with a limited understanding of the systems may find them difficult to comprehend. Therefore, when deciding what information to include in a maritime cyber report, the device manager 100 take its scope and audience into consideration, as the area of maritime cybersecurity is still fairly new. Reports are more effective in conveying information if they are visually comprehensive, while also including important facts about the vessel's environment. Moreover, images and graphs can convey messages quickly and to a non-cyber-aware audience like mariners, or ship engineers. In order to make the reports more user-friendly tables, graphs, bar charts, and pie charts can be used for presentation.

Figure 5:
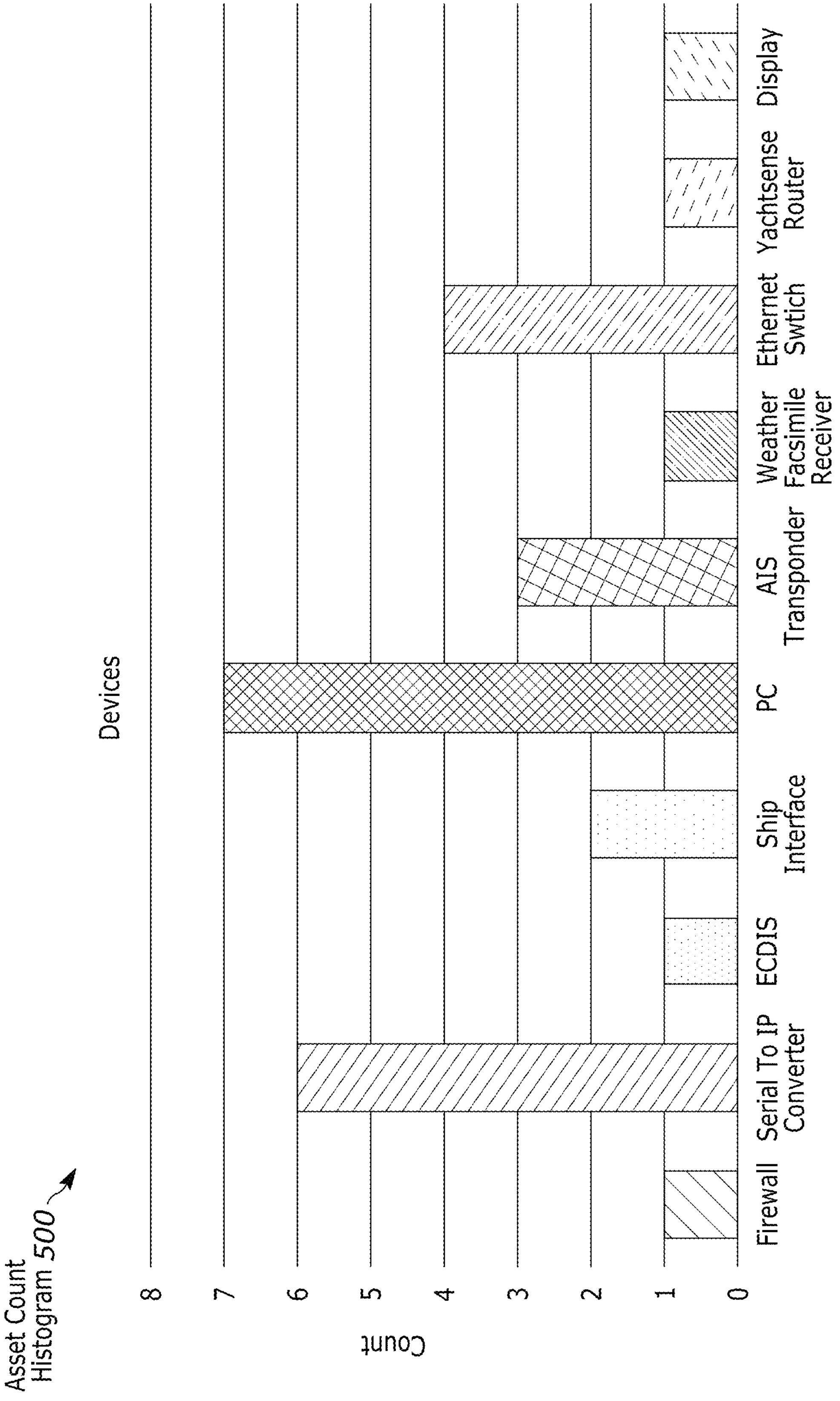
FIG. 5 is an example illustration of an asset count histogram according to a possible embodiment.

FIG. 5 is an example illustration of an asset count histogram 500 according to a possible embodiment. This graph displays the number of assets for each type. Following the profile and prediction of all hosts with a 'Device' value in classification, the count of all assets within each device category is shown as the histogram 500. By using this histogram 500, auditors and engineers can verify the number of pieces of equipment that are connected to a network on the basis of the type of device. This can be useful to also show the changes in a ship over the years. For example, there has been an increase in IoT devices being added to older ships to improve monitoring and other capabilities.

Figure 6:
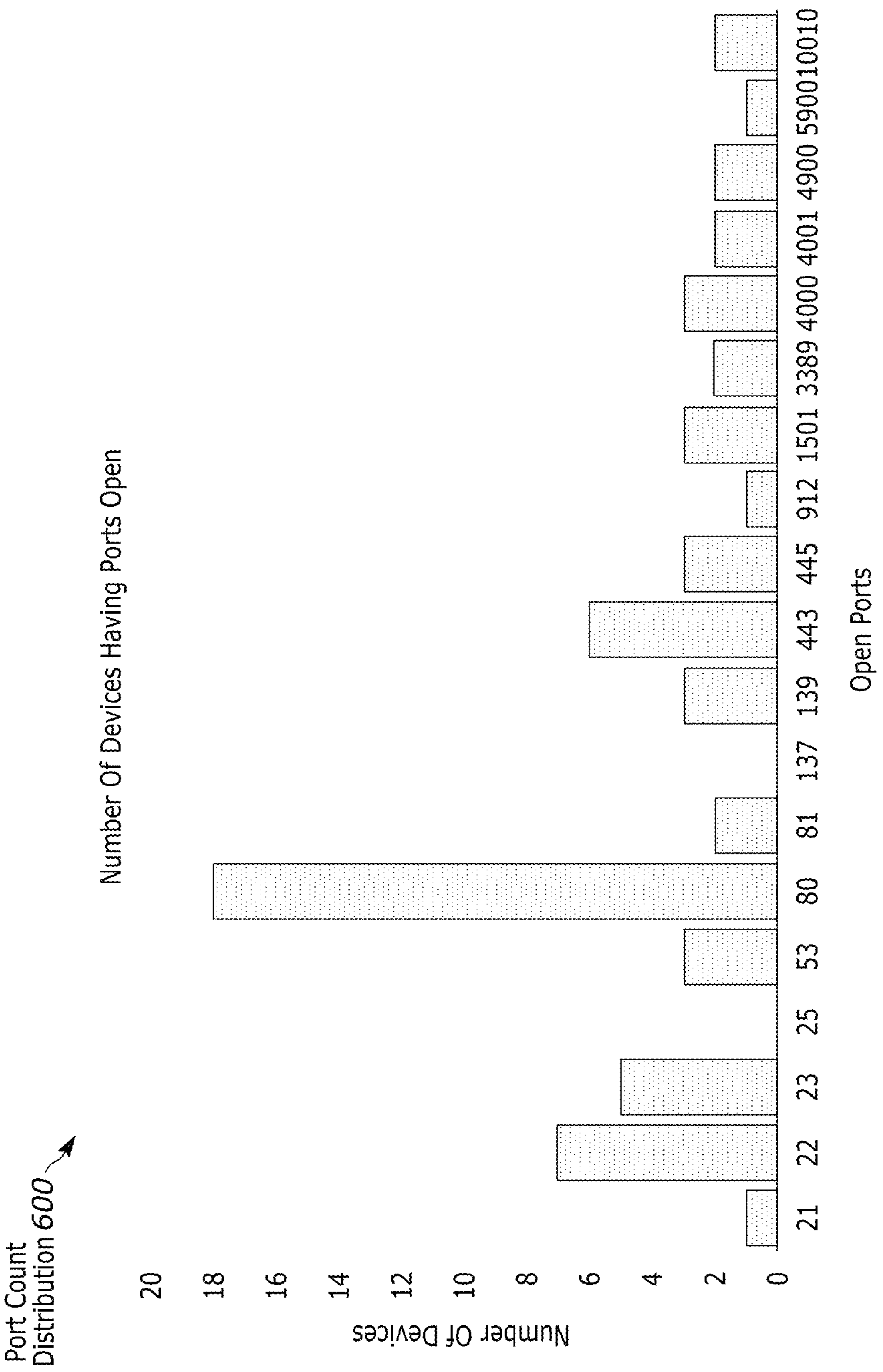
FIG. 6 is an example illustration of a port count distribution graph according to a possible embodiment.

FIG. 6 is an example illustration of a port count distribution graph 600 according to a possible embodiment. The graph 600 shows an overview of the number of devices that have specified ports open. The graph 600 assists in visualizing and reviewing the most commonly open ports in devices as well as unintentional ports that may be open for testing or auditing purposes. For example, the graph 600 shows the count of open ports across devices, where the X-axis shows the port numbers, and the Y-axis depicts the number of devices that have the port open.

Figure 7:
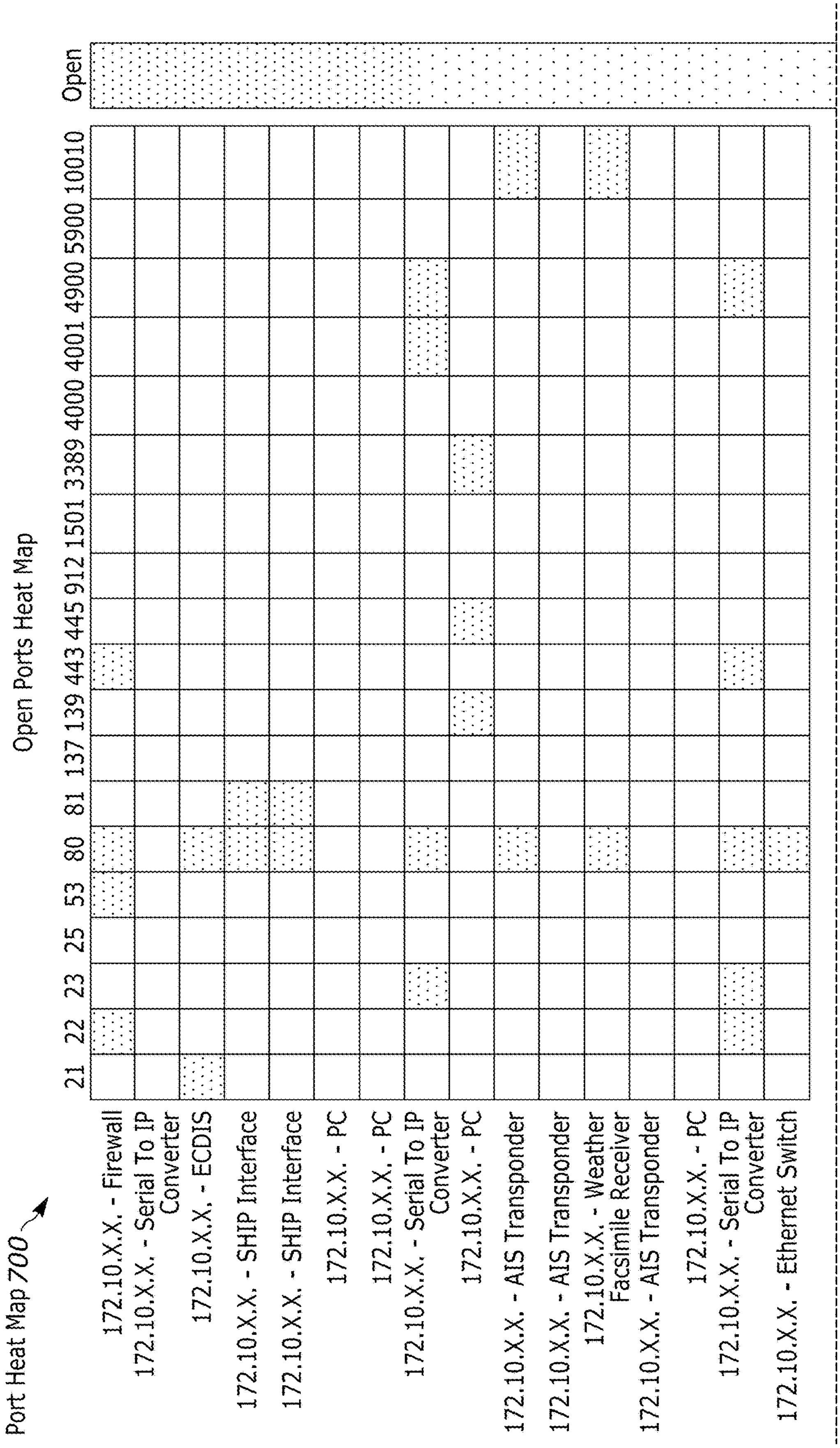
FIG. 7 is an example illustration of an open port heat map according to a possible embodiment.
Figure 7:
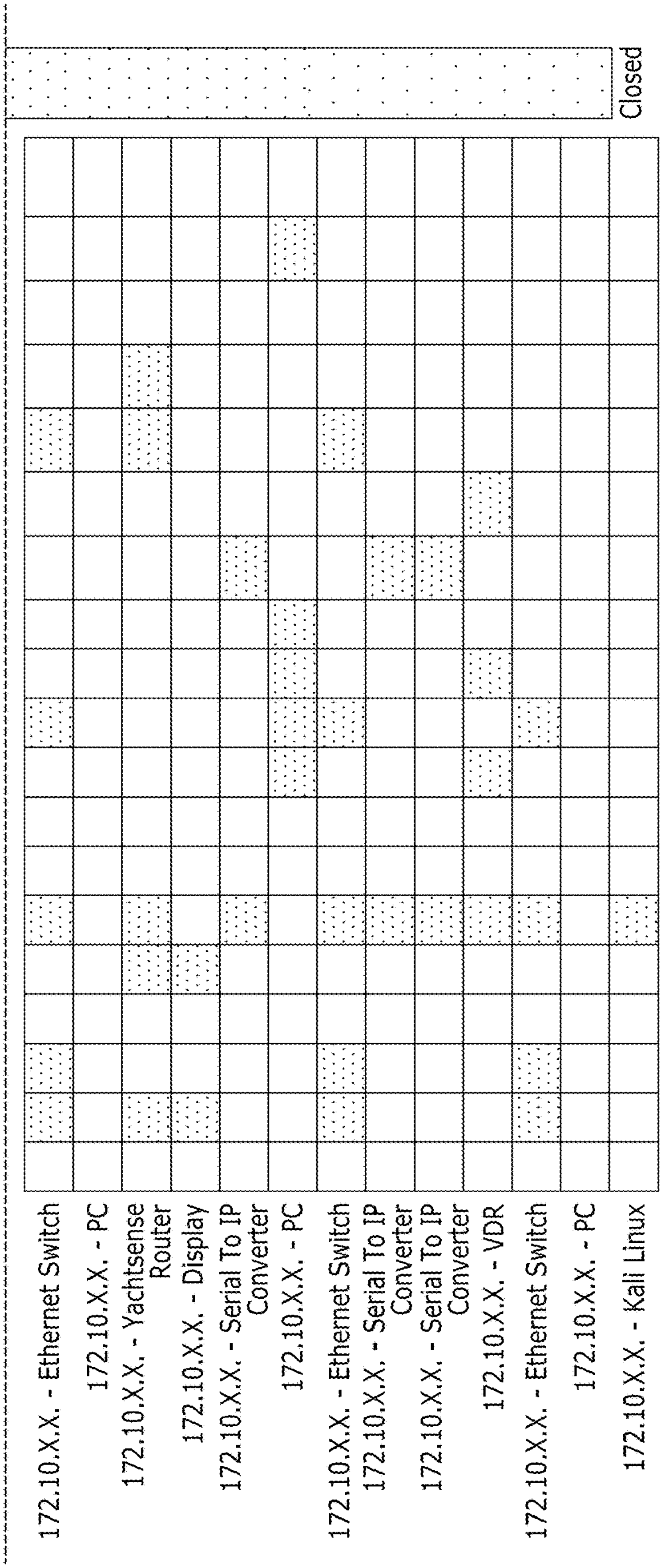

FIG. 7 is an example illustration of an open port heat map 700 according to a possible embodiment. Heat maps are visual representations of data using varying colors. This color-coding technique will help the user to understand complex information quickly and easily. Heat maps, when used with suitable color scales and according to similarity, the user will be able to see new patterns and structures that are not otherwise visible. Open ports heat maps illustrate which ports are open on each device. The X-axis of the map 700 represents different ports, whereas the Y-axis depicts the assets that were profiled previously, along with the predicted device type. Ports in a device that are 'open' are coded in a particular shade or color, while those that are 'closed' are coded in a different shade or color. As a result, it is possible to understand the characteristics of the various devices in relation to the similarities that exist between the device types and between devices produced by the same manufacturer.

Additional Embodiments

In a possible embodiment, the topology builder 106 can have a static nature, which means that the user may not be able to edit the topology interactively but may review and evaluate it based on the graph. The topology builder 106 creates a topology for a given period of time and then produces a network graph of the configuration at the time of the test execution. In case the user repeats the tests at a later time, the topology builder is executed again, generating a new graph based on the configuration. In addition, there is a possibility that devices may be missing from the topology graph if they are not connected to any other devices and are not communicating. An approach to addressing this is to obtain an Address Resolution Protocol (ARP) table that contains the list of all the devices, then plot them as single, idle nodes in the graph, and probe the open ports to gather more information. This embodiment can be used on ships and in other domains where major changes tend to happen around scheduled refits or maintenance, meaning updating the topology can be planned in advance.

In a possible embodiment regarding the profiling phase, there may be a lack of public datasets regarding maritime equipment. This can be addressed with access to a hardware testbed that had ship systems in a ship's bridge configuration. Data can therefore still be collected from real systems for the construction of this dataset, followed by verification. A human supervisor can verify the collected data during the initial stages, even if the classification process is automated, in order to ensure accuracy. Once the dataset has been created, the model profiles the hosts found during each test execution, while returning the results back to the dataset, thereby allowing the dataset to continuously grow. It can be useful to include large quantities of data from various devices, which is based on the number of devices available to the researcher. This can be addressed by collecting data from live networks onboard ships and in other domains.

In a possible embodiment, the limited quantity of data available may introduce overfitting or underfitting of the classifier model. Random forest classifiers can be used instead of decision trees by incorporating randomness and reducing fitting, but they may not completely eliminate it. In the random forest model, there may be a trade-off between accuracy and computation time. It may take longer to complete the model when using a large number of trees to construct the forest, but the accuracy score may increase as a result. Considering that the accuracy value stops improving after a certain threshold value, a smaller number of decision trees than the number at the threshold can be used. Other parameters can also be tuned and optimized since trees are sensitive to parameter values. The profiler may take a considerable amount of time when there are a large number of devices in the configuration, so in such a situation, reducing computational power and resources can be a possible solution.

CONCLUSION

Embodiments provide a device manager 100, an asset profiler that users can use to manage their asset inventories and comply with regulations and requirements, such as those in IACS UR 26 and UR 27. In an embodiment with a given network configuration, the tool automatically constructs a topology graph of communication flows and intelligently identifies the devices or assets on a bridge using the random forest classifier algorithm. To ensure potential users (i.e., mariners and engineers) understand the results, the device manager 100 also provides detailed information about the device(s) and their network(s). Onboard crew and engineers can use the graphs and charts produced by the tool to better understand their networks and systems and manage assets more efficiently, and better inform maintenance and security efforts. Generally speaking, this domain-focused tool is more accurate in classifying bridge equipment than similar works designed for IT/IoT environments. This can be the result of the number of bespoke and novel system solutions available in the maritime space and other unique domains, and therefore has more unique properties for the classifier to process. Disclosed embodiments are useful in the wider maritime domain, aviation domains, factory domains, cyber-physical topics of cybersecurity, and in other areas.

Security testers and auditors can use the tool on board vessels to gather situational awareness information about the systems and environments they are working in. The device manager 100 reduces time and effort, as a manual inspection of systems can otherwise be on the order of days instead of minutes, especially if panels need to be removed to access hidden components. The device manager 100 provides an automated, non-intrusive tool that speeds up the testing process and requires less specialized maritime expertise. Automated asset detection and classification can have even more benefit in future work, as pen testers can use these capabilities to build specific exploits for the system and network they are targeting. Security testing frameworks can offer exploit modules for IT devices and OT systems, such as SCADA components. A detailed ship-based asset inventory can also help select the right and most suitable exploit or test type for the device. An ethical ship-based penetration testing tool can be built to extend embodiments of this disclosure. This can also help cyber risk assessments, where people responsible for the devices/assets can identify the ones that are critical to operations and ensure that they are updated and patched and ensure proper security controls are in place.

Hardware Overview

According to a possible embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
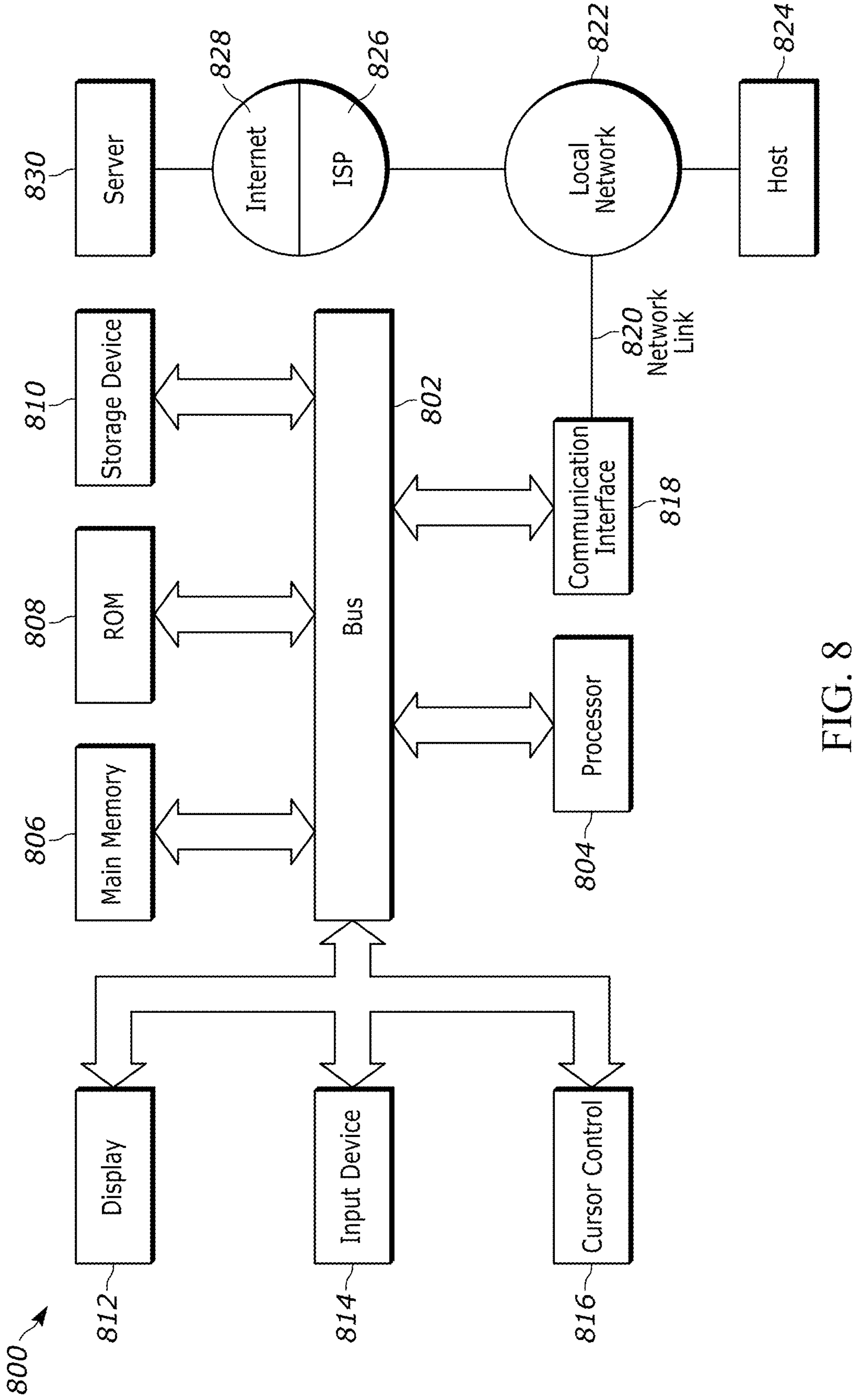
FIG. 8 is a block diagram that illustrates a computer system according to a possible embodiment.

For example, FIG. 8 is a block diagram that illustrates a computer system 800 upon which aspects of the illustrative embodiments may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812 for displaying information to a computer user. An input device 814, including alphanumeric and other keys, is coupled to bus 802 for communicating information and command selections to processor 804. Another type of user input device is cursor control 816, such as a mouse, a trackball, a touch screen, a track pad, and/or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge and/or any other storage media.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem or send the instructions over a network. A receiver, such as a modem, local to computer system 800 can receive the data. In an example, the receiver can use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented, such as to a wireless local area network (WLAN) or to a cellular network. In any such implementation, communication interface 818 sends and receives electrical, electromagnetic, radio, optical, and/or other signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822, and communication interface 818.

The received code may be executed by processor 804 as it is received, and/or stored in storage device 810, or other non-volatile storage for later execution.

Software Overview

Figure 9:
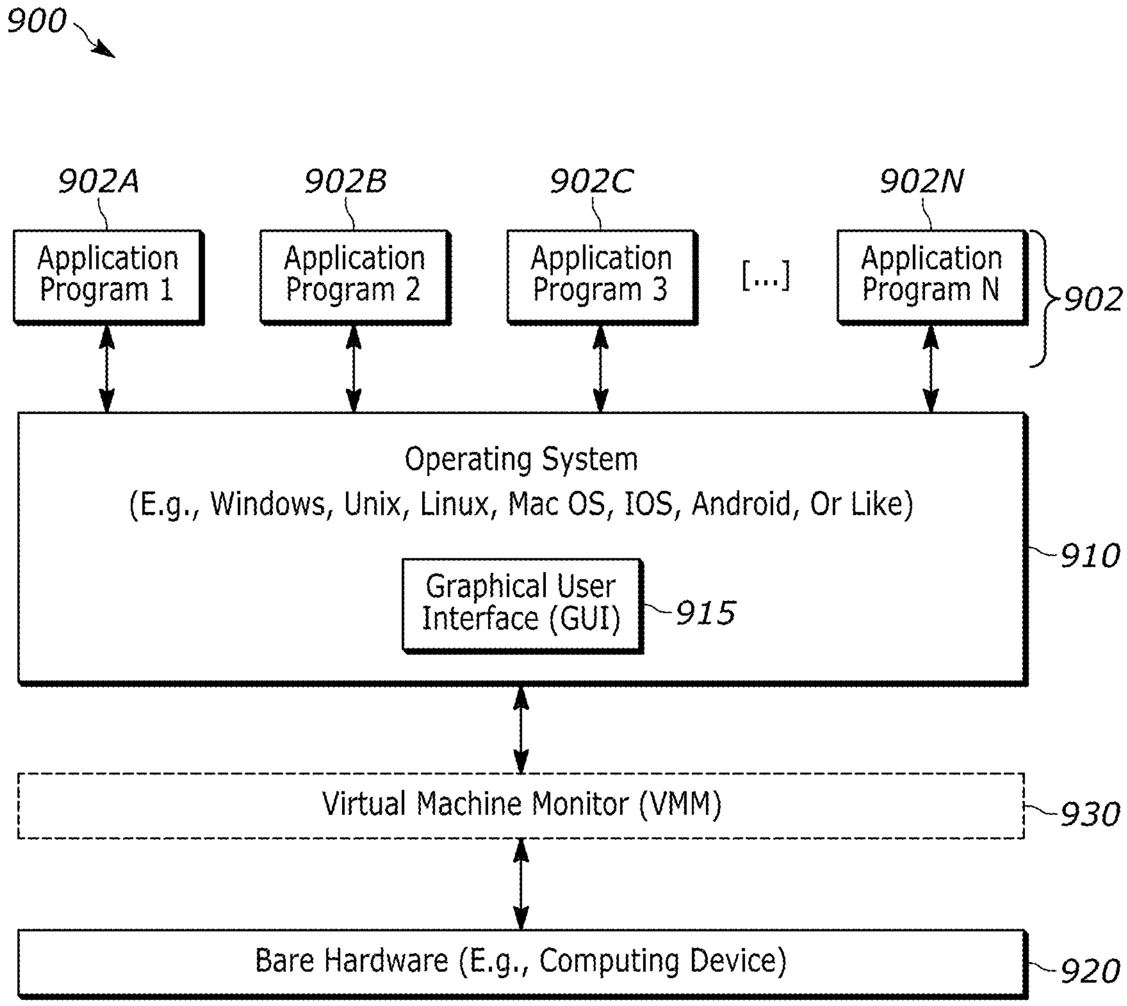
FIG. 9 is a block diagram of a basic software system according to a possible embodiment.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

performing a first query on a device of a network of operational technology devices, where operational technology devices operate with physical processes, where the device is a maritime vessel operational technology device;

gathering first feature information of the device based on the first query;

generating a first instance of a device record that includes the first feature information;

selecting a second query based on the first instance of the device record, the second query selected from a query set for features of operational technology devices operating in a particular physical domain, where the particular physical domain is a maritime vessel, the device is coupled to a bridge of the maritime vessel, and the second query is a query for a maritime vessel operational technology device communication protocol of the device;

performing the second query for the maritime vessel operational technology device communication protocol on the device;

gathering second feature information of the device based on the second query for the maritime vessel operational technology device communication protocol;

updating a device record corresponding to the first instance of the device record based on the second feature information to generate an updated device record; and predicting a type of the device based on the updated device record.

2. The method of claim 1, further comprising:

predicting a first type of the device based on the first instance of the device record; and updating the first instance of the device record based on the predicted first type of the device, wherein selecting the second query comprises selecting the second query based on the updated first instance of the device record.

3. The method of claim 2, wherein predicting the first type of the device comprises predicting that the first type of the device is an intermediate device that converts a first communication protocol of a connected device to a second communication protocol, selecting the second query comprises selecting the second query based on the first communication protocol and the second communication protocol, gathering the second feature information comprises gathering the second feature information of the connected device based on the second query, updating the device record comprises storing a connected device record based on the second feature information, and predicting the type of the device comprises predicting the type of the connected device based on the connected device record.

4. The method of claim 1, further comprising selecting the first query from a query set for features of operational technology devices operating in the particular physical domain, wherein the first instance is an instance of a plurality of instances of the device record, wherein each instance of the plurality of instances of the device record comprises a predetermined feature set of features of operational technology devices operating in the particular physical domain, and wherein each instance of the plurality of instances of the device record indicates whether features of the predetermined feature set are present.

5. The method of claim 4, wherein features in the feature set include a protocol feature corresponding to a communication protocol and a plurality of port features, each of the port features corresponding to a different port number.

6. The method of claim 1, wherein the vessel operational technology device communication protocol comprises a National Marine Electronics Association (NMEA) protocol or an Automatic Identification System (AIS) protocol.

7. The method of claim 1, wherein the query set is built to interrogate for features of operational technology devices operating in the particular physical domain.

8. The method of claim 1, further comprising creating a network communication flow graph of the network of operational technology devices, where the network communication flow graph includes:

a first network connection that uses a first communication protocol between a first device and an intermediate device, and a second network connection that uses a second communication protocol between the intermediate device and a second device, where the second communication protocol is different from the first communication protocol, wherein performing the first query comprises performing the first query based on the network communication flow graph.

9. The method of claim 1, wherein the predicting is performed by a classifier trained on data collected from a cyber-physical testbed set that is based on maritime hardware equipment configured into a representation of a bridge of a ship.

10. A network device manager for a maritime vessel bridge, the device manager comprising one or more computing devices comprising a hardware and memory that host programs comprising:

a feature extractor that:

performs a first query on a device of a network of operational technology devices coupled to the maritime vessel bridge, where the operational technology devices operate with physical processes of the maritime vessel, where the device is a maritime vessel operational technology device, gathering information of a feature of the device based on at least the first query, and generating a device record that includes the feature in a set of features;

a database that stores the device record;
an encoder that generates first encoded data based on the set of features; and
a classifier that predicts a type of device based on the first encoded data by comparing the first encoded data to stored device feature data,
wherein the device manager updates the set of features in the device record with information of the predicted type of device,
wherein the feature extractor:
selects a second query based on information of the predicted type of device, the second query selected from a query set for features of maritime vessel operational technology devices, where the second query is a query for a maritime vessel operational technology device communication protocol of the device,
performs the second query for the maritime vessel operational technology device communication protocol on the device, and
gathers information of an additional feature of the device based on the second query for the maritime vessel operational technology device communication protocol,
wherein the device manager updates the set of features in the device record with the information of the additional feature,
wherein the encoder generates second encoded data based on the set of features including the additional feature, and
wherein the classifier predicts an updated type of the device based on the second encoded data by comparing the second encoded data to the stored device feature data.

11. The network device manager for a maritime vessel bridge of claim 10,
wherein the classifier predicts the type of device by predicting the type of device is an intermediate device that converts a first communication protocol of a connected device to a second communication protocol,
wherein the feature extractor selects the second query to identify the device connected to the intermediate device based on the first communication protocol and the second communication protocol.

12. The network device manager for a maritime vessel bridge of claim 11, wherein the device manager:
detects packets coming out of the intermediate device to identify the second communication protocol,
deconstructs packets of the second communication protocol from the intermediate device,
identifies the first communication protocol as a National Marine Electronics Association protocol,
constructs packets for the second query based on the National Marine Electronics Association protocol.

13. The network device manager for a maritime vessel bridge of claim 10, wherein features in the set of feature include a protocol feature corresponding to a communication protocol and a plurality of port features, each of the port features corresponding to a different port number.

14. The network device manager for a maritime vessel bridge of claim 10, wherein the query set is built to interrogate for features of the operational technology devices that operate with physical processes of the maritime vessel.

15. One or more non-transitory computer-readable storage media storing instructions that, when executed by one or more processors, cause:
performing a first query on a device of a network of operational technology devices, where operational technology devices operate with physical processes, where the device is a maritime vessel operational technology device;
gathering first feature information of the device based on the first query;
generating a first instance of a device record that includes the first feature information;
selecting a second query based on the first instance of the device record, the second query selected from a query set for features of operational technology devices operating in a particular physical domain, where the particular physical domain is a maritime vessel, the device is coupled to a bridge of the maritime vessel, and the second query is a query for a maritime vessel operational technology device communication protocol of the device;
performing the second query for the maritime vessel operational technology device communication protocol on the device;
gathering second feature information of the device based on the second query for the maritime vessel operational technology device communication protocol;
updating a device record corresponding to the first instance of the device record based on the second feature information to generate an updated device record; and
predicting a type of the device based on the updated device record.

16. The one or more non-transitory storage media of claim 15, wherein the instructions, when executed by the one or more processors, further cause:
predicting a first type of the device based on the first instance of the device record; and
updating the first instance of the device record based on the predicted first type of the device,
wherein selecting the second query comprises selecting the second query based on the updated first instance of the device record.

17. The one or more non-transitory storage media of claim 16, wherein
predicting the first type of the device comprises predicting that the first type of the device is an intermediate device that converts a first communication protocol of a connected device to a second communication protocol,
selecting the second query comprises selecting the second query based on the first communication protocol and the second communication protocol,
gathering the second feature information comprises gathering the second feature information of the connected device based on the second query,
updating the device record comprises storing a connected device record based on the second feature information, and
predicting the type of the device comprises predicting the type of the connected device based on the connected device record.

18. The one or more non-transitory storage media of claim 15, wherein the instructions, when executed by the one or more processors, further cause:
selecting the first query from a query set for features of operational technology devices operating in the particular physical domain,
wherein the first instance is an instance of a plurality of instances of the device record, wherein each instance of the plurality of instances of the device record comprises a predetermined feature set of features of operational technology devices operating in the particular physical domain, and wherein each instance of the plurality of instances of the device record indicates whether features of the predetermined feature set are present.

19. The one or more non-transitory storage media of claim 18, wherein features in the feature set include a protocol feature corresponding to a communication protocol and a plurality of port features, each of the port features corresponding to a different port number.

20. The one or more non-transitory storage media of claim 15, wherein the instructions, when executed by the one or more processors, further cause:

creating a network communication flow graph of the network of operational technology devices, where the network communication flow graph includes:

a first network connection that uses a first communication protocol between a first device and an intermediate device, and a second network connection that uses a second communication protocol between the intermediate device and a second device, where the second communication protocol is different from the first communication protocol, wherein performing the first query comprises performing the first query based on the network communication flow graph.

* * * * *